United States Patent [19]

Jones

[11] E Re. 29,470

[45] Reissued Nov. 8, 1977

[54] CONTROL MECHANISMS FOR DOCUMENT-HANDLING APPARATUS

[75] Inventor: Alan P. Jones, Levittown, Pa.

[73] Assignee: Brandt-Pra, Inc., Cornwells Heights, Pa.

[21] Appl. No.: 671,074

[22] Filed: Mar. 29, 1976

Related U.S. Patent Documents

Reissue of:

[64] Patent No.: 3,870,868
Issued: Mar. 11, 1975
Appl. No.: 273,999
Filed: July 21, 1972

[51] Int. Cl.[2] ..... G06M 7/06

[52] U.S. Cl. ..... 235/92 SB; 235/92 V; 235/92 PE; 235/92 R; 235/98 C

[58] Field of Search ..... 235/92 SB, 92 PE, 92 V, 235/98 C; 250/561, 571

[56] References Cited

U.S. PATENT DOCUMENTS

| | | | |
|---|---|---|---|
| 2,760,315 | 8/1956 | Wilckens | 235/98 C |
| 3,025,771 | 3/1962 | Uchida | 235/98 C |
| 3,188,619 | 6/1965 | Hemphill | 235/92 SB |
| 3,329,806 | 7/1967 | McCauley | 235/92 CA |
| 3,582,618 | 6/1971 | Bergman | 235/92 SB |
| 3,588,472 | 6/1971 | Glaster | 235/92 SB |
| 3,660,670 | 5/1972 | Howard | 250/561 |

*Primary Examiner*—Joseph M. Thesz
*Attorney, Agent, or Firm*—Louis Weinstein

[57] ABSTRACT

In a document-handler adapted for feeding, separating and stacking sheets and the like, control means for sensing and counting separated sheets and having a capability of counting, statistically sampling and batching and including means for anticipating jam conditions to protect the counting mechanism, as well as the sheets, from being damaged. The sensing mechanism has the capability of self-adjustment to automatically compensate for any and all conditions which affect the sensitivity of the sensing device, and further has a capability of distinguishing between separated documents and apertured or mutilated documents. In accordance with the desired operation, the electronic circuitry controls the mechanical functions to achieve the desired counting, separating, batching and statistical sampling operations.

17 Claims, 13 Drawing Figures

FIG. 2
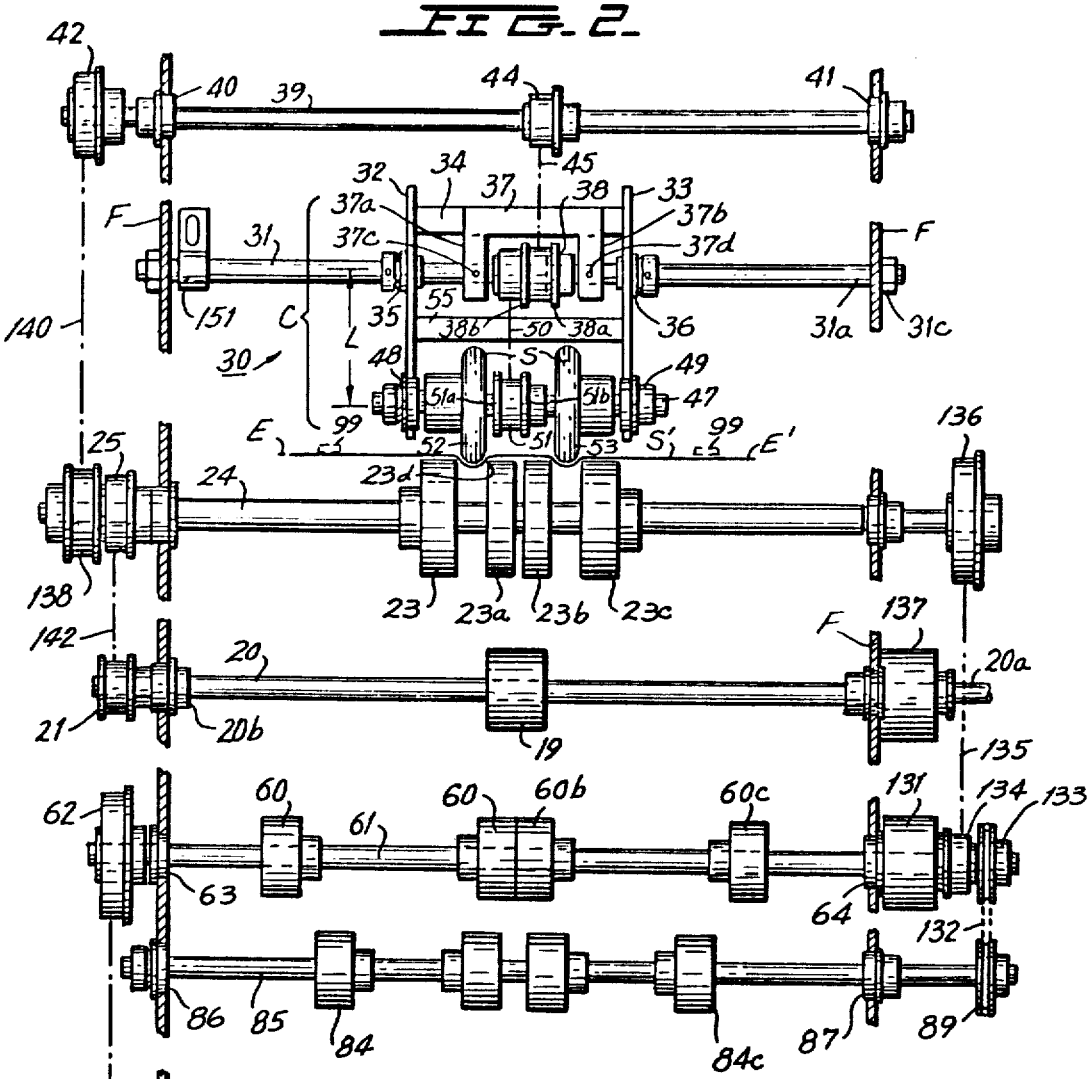
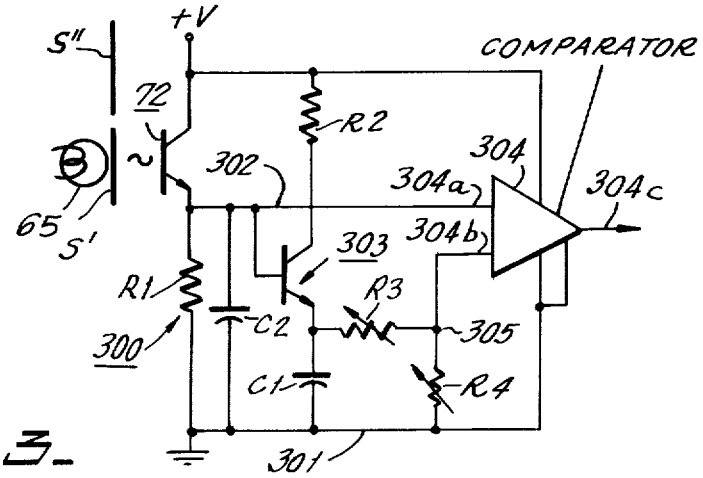
FIG. 3

FIG. 4b
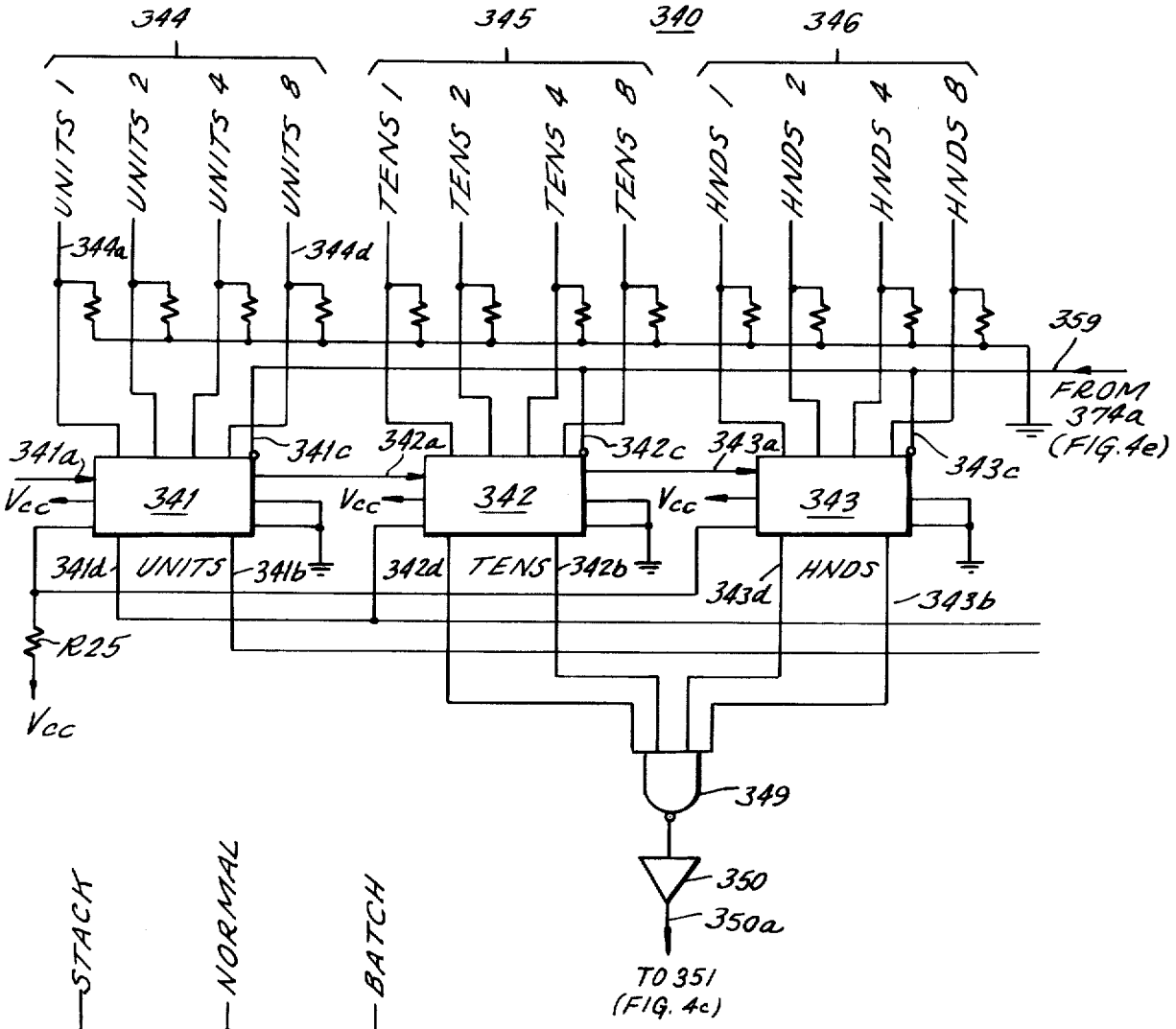
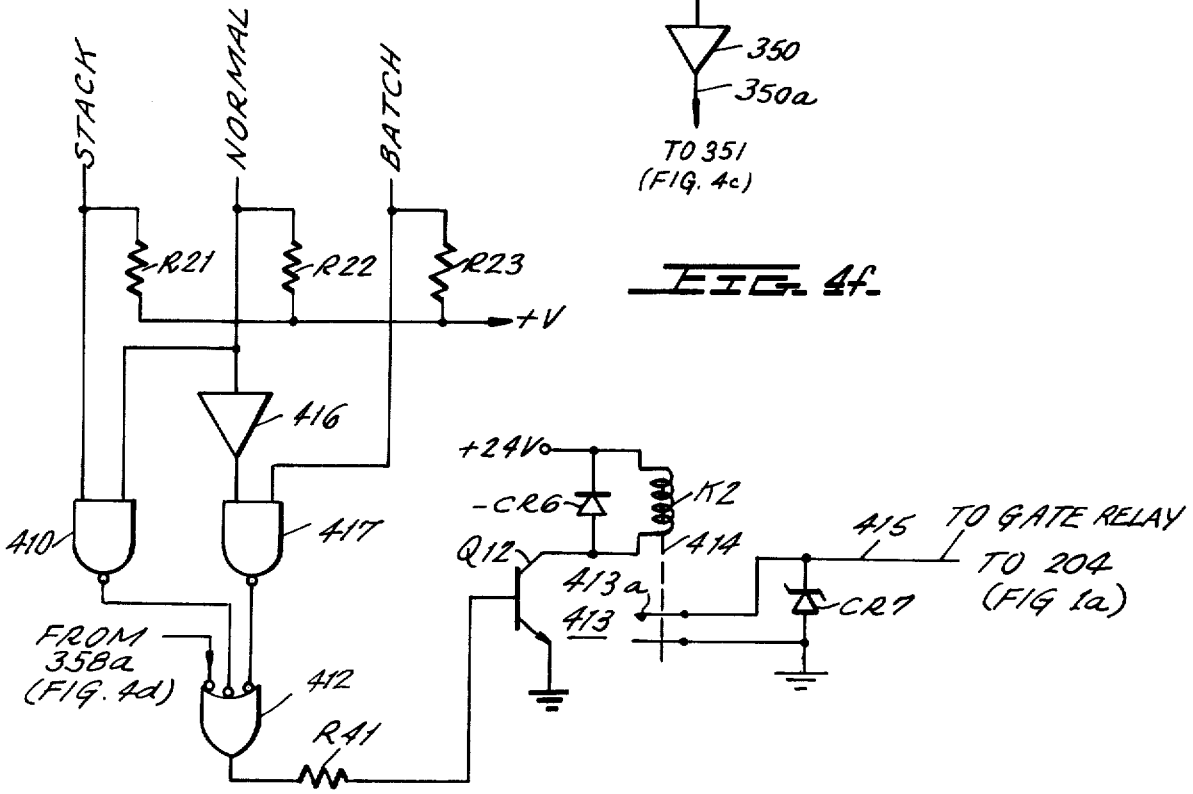
FIG. 4f

START
HALT
CONTINUE
STOP
FROM 398 (FIG. 4c)
R17
R18
R19
R20
+V
FROM 397a (FIG 4d)
373
374
374a
TO 358 (FIG. 4d) & 359 (FIG. 4b)
376a
375
376
377
378
376b
RUN FF
STOP FF
TO 318 (FIG. 4a)
FROM 325a (FIG. 4a)
379
380
FROM 407 (FIG. 4d)
381
382
R39
R40
R38
Q7
CR5
Q8
Q10
402
402a
402b
+24v
R41
Q9
R42
Q11
403
K1
405
460
461
TRIAC
TO MOTOR M
404
110 VAC SUP
MOTOR CONTROL
TO BRAKE 137 (FIG. 2)
TO CLUTCH (FIG. 2)

CONTROL MECHANISMS FOR DOCUMENT-HANDLING APPARATUS

Matter enclosed in heavy brackets [ ] appears in the original patent but forms no part of this reissue specification; matter printed in italics indicates the additions made by reissue.

The present invention relates to electronic control means and more particularly to novel electronic control means for use with document handling equipment for feeding, separating and stacking documents which electronic equipment monitors all phases of the physical operations to provide reliable and accurate feeding, counting and stacking and to prevent jamming.

BACKGROUND OF THE INVENTION

Document handling devices are presently employed in a large number of different applications. Some examples of such document handlers are devices for counting checks, punch cards, food stamps, paper currency and bank coupons, to name just a few. The basic requirements of such devices are to provide reliable operation at relatively high operating speeds in the feeding, separating, endorsing, and stacking of the documents being handled. For example, during such high speed operations, a separation between documents may be quite small, requiring a sensing device capability of detecting such small separation distances. Due to the high speed operation, it is also important to provide means for protecting against faulty operation since if a jam were to occur with the documents fed at reasonably high rates of speed, severe damage to the mechanism, as well as the sheets, may occur before corrective measures can be taken.

It is also well known that the document feeders providing such high speed operation generate an appreciable amount of dust which, together with other ambient conditions, serves to deteriorate the sensitivity and hence the capability of the sensing means to function properly.

BRIEF DESCRIPTION OF THE INVENTION AND OBJECTS

The present invention is characterized by providing means for overcoming all of the aforementioned disadvantages through the use of [novel] sensing means having a capability of automatically adjusting its sensitivity in accordance with changes in ambient conditions. The sensing means further incorporates means for counting the documents and sensing the gap between separated documents and further incorporates means for distinguishing gaps *of at least a predetermined length* between adjacent documents from perforations *smaller than said predetermined length* provided within documents (such as punch-cards) or slits or tears and the like which may be formed as a result of partial or even severe mutilation of a document. The [same sensing means] *apparatus* further incorporates means for anticipating a jam condition by automatically halting the document handling apparatus upon failure of the sensing means to sense a gap between adjacent documents within a predetermined time period *which predetermined time period is greater than the time required for a document to pass the sensing means.*

All of the above capabilities are obtained in a control means which has the further novel capability of increasing the flexibility and effectiveness of the document handling apparatus to perform a variety of document handling operations such as, for example, endorsing, batching and statistical sampling not heretofore capable of being obtained through document-handlers and control devices which have heretofore been available.

[It is therefore one object of the present invention to provide a novel control means for document handlers and the like capable of automatically adjusting its reading sensitivity in accordance with changes in any one of a variety of ambient conditions affecting the operation.]

[Another] *An* object of the present invention is to provide novel electronic control means for document-handlers and the like having capability of distinguishing between adjacent separated documents for counting purposes while ignoring perforations, punches, slits or mutilations within a document as an erroneous indication of a separation between documents.

Another object of the present invention is to provide novel electronic control means for document-handling apparatus and the like to enhance the capability of such apparatus to perform operations such as reliable high speed counting, batching, statistical sampling and is capable of retaining an existing count and resuming counting even in the event of jams or temporary exhaustion of the supply of documents being counted.

These as well as other objects of the present invention will become apparent when reading the accompanying description and drawing in which:

FIG. 1 is a simplified elevational view of a document handling device for feeding, separating, counting and stacking paper documents and the like.

FIG. 2 shows a plan view of the various feed elements of FIG. 1.

FIG. 3 is a schematic diagram of the diagram of the compensating quantizing threshold device employed for counting documents separated by the document-handler of FIGS. 1 and 2.

FIGS. 4a–4f are schematic diagrams which form the control circuitry for the document-handling device of FIGS. 1 and 2.

DETAILED DESCRIPTION OF THE FIGURES

Figure 1:
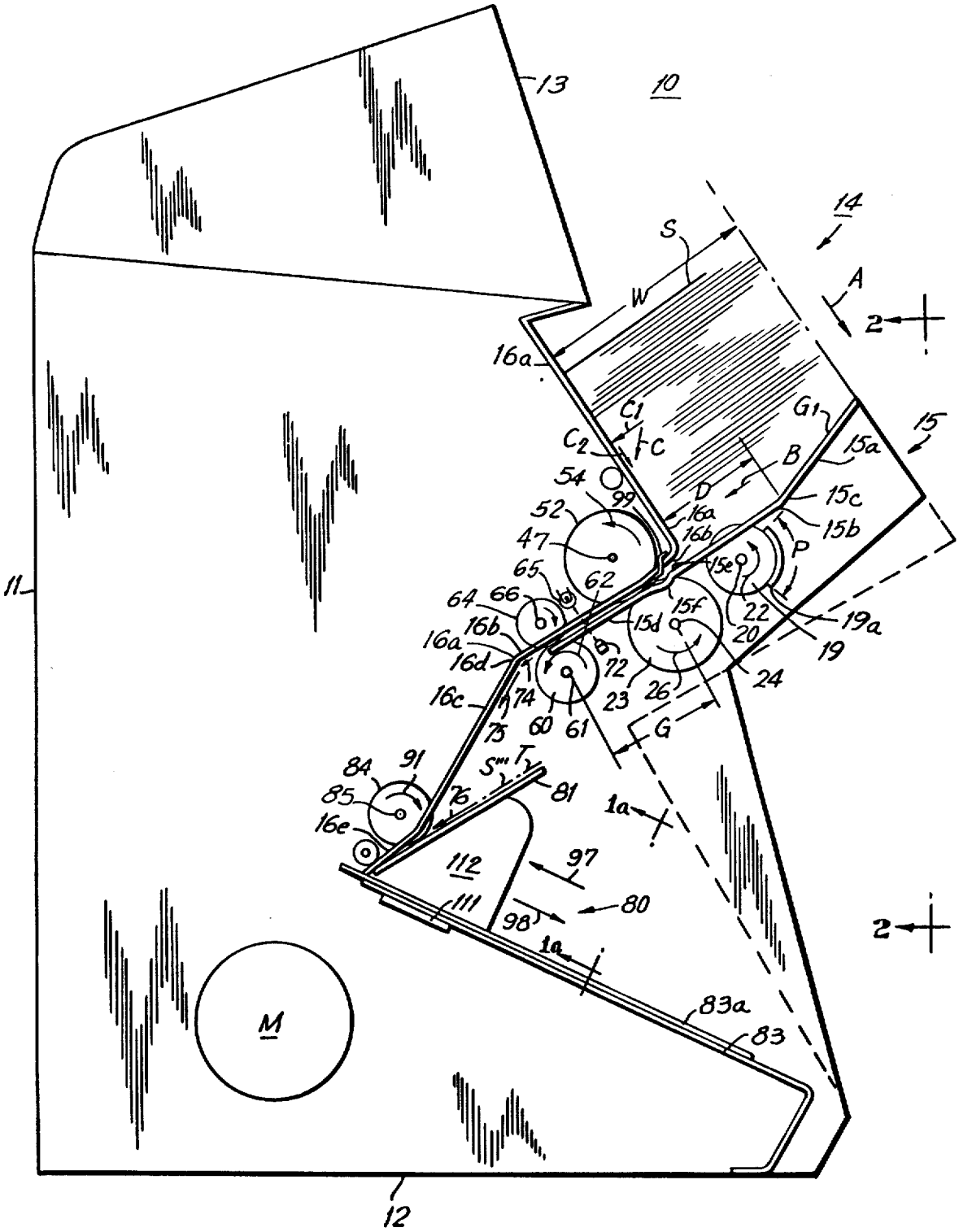

FIGS. 1 and 2 show, in simplified fashion a document-handling device which is described in greater detail in co-pending application Ser. No. 227,847, filed Feb. 22, 1972 and assigned to the assignee of the present invention. The detailed structure of the document-handling device of the aforementioned U.S. application will be omitted herein for purposes of simplicity, it being understood that the structure described herein is incorporated in the present application by reference thereto.

The document-handling device has the major functions of providing means for feeding sheets of varying thicknesses, sizes, finishes and the like and of accepting such dissimilar sheet sizes without first collating sheets into groups having similar dimensional and/or surface characteristics and includes means for separating and counting the sheets and stacking the sheets once separated.

Device 10 of FIGS. 1 and 2 is comprised of a housing 11 having a base portion 12 for supporting device 10 upon any suitable surface such as, for example, a table or counter. The relatively small size and light weight of the device greatly enhances its portability and facilitates handling of the device to enable its use in practically any desired location.

The housing 11 is provided with a front face 13 at its upper end which may be fitted or otherwise provided with control panels incorporating controls to be more fully described hereinbelow for turning the machine on and off, providing for statistical sampling or batch counting and the like and providing visually observable means indicating the count of the number of documents handled by the device.

Face 13 forms a portion of the front of housing 11 which is further provided with an infeed hopper 14 consisting of a plate member 15 for stacking sheets or other documents S. The stack S has a portion of its weight resting upon rearward end 15a of plate 15 and the sheets have their forward edges resting against a plate 16a. The inclination of the infeed stacker 14 is such that the weight of the sheets within the stack serve to retain the sheets within the infeed hopper without providing any top weight upon the stack, as well as serving to facilitate feeding of the documents from the infeed hopper, which features are described in detail in the aforementioned application and will be omitted herein for purposes of simplicity.

A picker wheel 19 mounting to rotate about shaft 20 is provided with an insert or raised portion 19a which protrudes through a suitable opening provided in plate 15a to engage the lowermost sheet within the stack and advance this sheet toward a drive wheel 23 mounted to rotate in a direction shown by arrow 26 about shaft 24. Positioned above the drive wheel is a stripper wheel 52 mounted to rotate upon shaft 47 and being resiliently mounted in a manner described in detail in the aforementioned U.S. application to perform a stripping operation. Wheel 52 rotates in the direction shown by arrow 54 and serves to move documents other than the bottom-most sheet in a rearward direction so as to permit only the document to pass between wheels 23 and 52 toward an acceleration wheel assembly to be more fully described.

The coefficient of friction of the periphery of wheel 23 is greater than the coefficient of friction of the periphery of wheel 52 so that when only a single sheet passes between these wheels (as the result of either a stripping operation or the feed of only a single sheet), drive wheel 23 exerts the major influence upon the sheet causing it to be fed in the forward feed direction toward acceleration wheel 60 mounted to rotate in the direction shown by arrow 62 about shaft 61. The acceleration wheel 60 cooperates with free-wheeling rollers 64 mounted to rotate about shaft 66. The acceleration wheel 60 rotates at a speed greater than the rotating speed of wheel 23 causes the sheet entering between wheel 60 and free-wheeling roller 64 to be advanced toward a stacking location at a speed greater than the speed achieved by a sheet passing between wheels 23 and 52. This operation causes a small gap to be formed between the trailing edge of the sheet feed between wheels 60 and 64 and the leading edge of the next document being fed toward wheel 60 by wheels 23 and 52. This gap is sensed by means of a light source 65 cooperating with a light-sensitive transistor 72 or other suitable light-sensitive device which generates a count pulse when the "gap" is in the region between light source 65 and transistor 72. Obviously, plates 15a and 16a are provided with suitable openings (not shown) to permit the passage of light between devices 65 and 72 when the "gap" is in this region.

Sheets advanced by acceleration wheel 60 are "kicked" into a stacker mechanism comprised of a stacker plate 81 and a kicker wheel 84 mounted to rotate about a shaft 85 in the direction shown by arrow 91 so as to neatly stack counted sheets within the stacker mechanism. The stacking plate 81 is urged in the direction of arrow 97 by suitable bias means described in greater detail in the aforementioned U.S. application. As the number of sheets in the stacker is increased, the sheets urge plate 81 in the direction shown by arrow 98 against the force of the biasing means to firmly retain the sheets within the stacker.

FIG. 2 shows the driving mechanisms employed for operating the various wheels described hereinabove in connection with FIG. 1. The apparatus is provided with a motor M having an output shaft 129 extending through machine frame F to which motor M is securely fastened. A pulley 130 is rigidly secured to shaft 129 and drives the acceleration wheel shaft 61 by means of a belt 63 entrained about pulley 130 and a pulley 62 mounted to acceleration wheel shaft 61. The opposite end of shaft 61 is provided with pulleys 133 and 134. Pulley 133 is locked to shaft 61 and drives the kicker wheel shaft 85 by belt 132 which is entrained about pulley 133 and a pulley 89 locked to shaft 85. Belt 132 is a resilient O-ring type belt and is looped in a "figure-eight" fashion to rotate shaft 85 in a direction reverse from that of shaft 61. Thus, whenever motor M is energized, shafts 61 and 85, which are directly coupled thereto, are rotated.

Shaft 61 is further provided with a clutch mechanism 131 which, when energized, causes the pulley 134 mounted upon clutch 131 to rotate. When deenergized, clutch 131 causes pulley 134 to be free-wheeling relative to shaft 61. Belt 135 is entrained about pulley 134 and a pulley 136, locked to one end of drive wheel shaft 24. The opposite end of drive wheel shaft 24 has two pulleys 25 and 138 locked to the shaft. A belt 142 is entrained about pulley 25 and pulley 21, which is locked to the picker wheel shaft 20. Belt 140 is entrained about pulley 138 and idler shaft pulley 42 which is locked to the idler shaft 39. Shaft 39 serves to impart rotation to the stripper wheels 52, 52 by means of a belt 45 entrained about pulleys 44 and 38, respectively, locked to shafts 39 and 31. A second pulley portion of pulley 38 imparts rotation to a pulley 51 mounted to stripper wheel shaft 47 by means of a belt 50. This "floating mechanism" for the stripper wheels 52, 52 serves to impart rotation to stripper wheels 52, 52 while freely permitting the stripper wheel assembly 30 to "float" above the drive wheels 23–23c in a manner which is set forth in detail in the aforementioned U.S. patent application.

Pulleys 133 and 89 are provided with semi-circular grooves around their periphery for receiving O-ring type belt 132. All of the remaining pulleys are provided with gear-like outer peripheries for engaging teeth provided on the belts which they engage, which belts are commonly referred to as timing belts. All of the belts have been shown in FIG. 2 in phantom line fashion to facilitate and simplify an understanding of FIG. 2.

An electromagnetic brake 137 is fastened to machine frame F and selectively engages one end 20a of picker wheel shaft 20. When energized, brake 137 abruptly stops shaft 20 from rotating. When deenergized, brake 137 permits shaft 20 to freely rotate.

In operation, shafts 61 and 85 continuously rotate as long as motor M is energized. Clutch 137 permits drive wheel shaft 24, idler shaft 39, and picker wheel shaft 20 to be selectively disengaged from motor M when it is energized. Clutch 131 and brake 137 are operated substantially simultaneously to both disengage and abruptly halt the rotation of shafts 24, 39 and 20, even though motor M is energized.

Figure 1A:
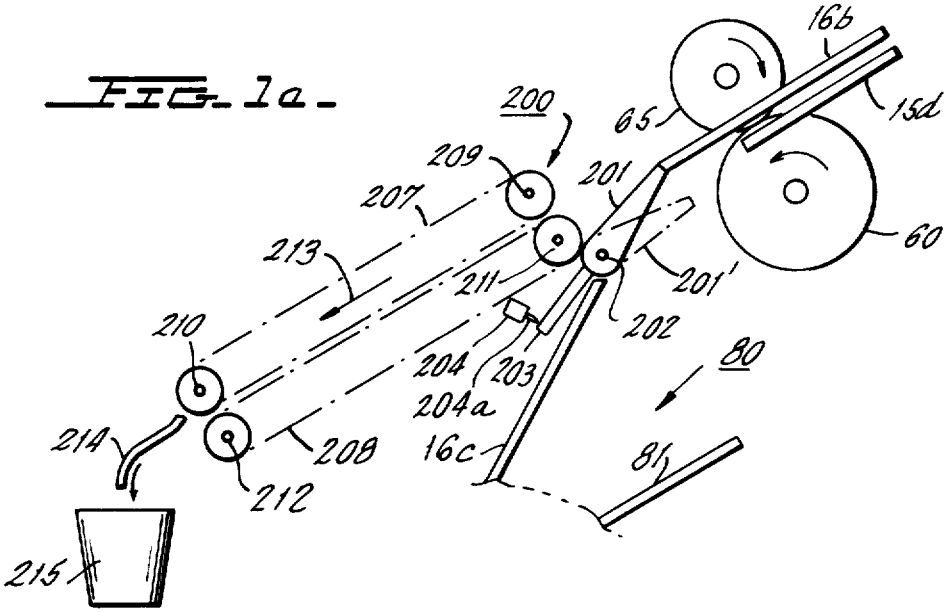
FIG. 1a shows an elevational view of a statistical sampling mechanism for use with the apparatus of FIG. 1.

The advantageous features of the driving and control mechanisms for the document-handling apparatus can best be appreciated from a description of the gate assembly 200 of FIG. 1a, which is provided for performing "statistical sampling" and/or collating operations and comprises a gate member 201 rigidly secured to shaft 202. At least one end of shaft 202, which extends to one side wall of the machine frame (not shown for purposes of simplicity) is fitted with a lever arm 203 rigidly secured thereto. A relay 204 has its armature 204a coupled to arm 203 and, when deenergized, maintains the gate 201 in the solid line position. Energization of the relay causes the gate and arm to move against the force of a biasing spring (not shown) to the dotted line position 201'.

Let [is] *it* be assumed that it is desired to count a large number of sheets while retaining only "statistical samples" of the sheets being counted (for example, every 100th sheet). The gate is maintained in the dotted line position 201' causing sheets advanced by the acceleration wheels 60 to pass over gate 201 and be fed between belts 207 and 208 entrained about roller pairs 209–210 and 211–212, respectively. Belts 207 and 208 advance the sheets in the direction of arrow 213 where a curved plate 214 deflects the counted sheets into a waste container or other suitable depository 215. As the trailing edge of the "99th" sheet clears gate 201 and enters between belts 207 and 208, relay 204 is energized to move the gate to a solid line position 201, causing the "100th" sheet to be moved toward stacker 80. As the 100th sheet passes gate 201, relay 204 is energized to cause the next sheet to be fed between belts 207 and 208. This operation is repeated wherein the document-handling device counts the total number of sheets and retains only every 100th sheet in stacker 80, as a "statistical simple". The remaining sheets in the depository 215 may be discarded or put to any other desired use.

Obviously, any desired statistical sample may be selected by means of an adjustable switch means to be described in greater detail in connection with the electronic control circuitry. As the gap between separated sheets is detected by sensor 72, the counter provided in the electronic control unit to be more fully described hereinbelow has its count advanced for each gap sensed. The accumulated count in the counter is compared against the setting of the desired statistical sample to activate relay 204 so as to accumulate only the statistical samples in stacker 80 while feeding remaining sheets to the depository 215. The clutch and brake mechanisms as described hereinabove are selectively activated by an "N−1" signal and "N+1" signal to assure the presence of a gap G of sufficient length between the sheet preceding the "Nth" sheet and the sheet immediately following the "Nth" sheet to provide sufficient time for physical movement of gate 201. Decoding circuitry within the electronic control means generates an N−1 signal when the trailing edge of the sheet preceding the "Nth" sheet passes sensor 72, causing the drive, stripper and picker wheels to be disengaged from the motor drive and be abruptly halted as a result of actuation of the electromagnetic brake 137 so as to "slow down" the "Nth" document. Gate 210 is moved from the dotted line position 201' and the brake and clutch mechanism are then released to continue the feed operation. When the trailing edge of the "Nth" sheet is sensed, the above operation is repeated in the reverse order to set the gate to the dotted line position 201'. The feed operation is again restored until the next statistical sample approaches sensor 72. The gate assembly described hereinabove may also be employed for collating. For example, it may be desired to stack every "odd" sheet (an original) in one pile and every "even" sheet (a carbon copy of the original sheet) in a separate stack. This may be done by operating the gate as described above between every sheet fed to the apparatus. It is also possible, for example, to stack original sheets in the stacker and, for example, five carbon copies of each original sheet in the depository 215 for further collating or processing, if desired.

The document handler in FIGS. 1 and 2 may also be employed for performing "batching" operations. For example, let it be assumed that a large number of sheets are to be piled into separate stacks with each stack containing an equal predetermined number of sheets. For example, let it be assumed that a large number of dollar bills (paper currency) are to be stacked into stacks each containing one hundred one-dollar bills. The paper currency may be stacked in infeed hopper 14 and may contain any number of bills up to the maximum capacity which can be handled by the infeed hopper. A "start" button is depressed and the mechanism begins to count bills. When the "100th" bill passes sensor 72 the counter compares its count against the matching count set into the electronic control mechanism to generate a signal after the passage of the 100th bill which energizes electromagnetic brake 137 and deenergizes clutch 131 so as to abruptly halt the picker, stripper and drive wheels while continuously rotating the acceleration and picker wheels to assure positive stacking of the 100th bill within stacker 80. The machine then automatically turns off, at which time a stack of exactly one hundred one-dollar bills will be neatly stacked in the stacker 80. The operation may then be repeated by depressing the "start" button to count and stack the next group of 100 one-dollar bills.

Let it be assumed that the "start" button has been depressed and that the document-handling apparatus 10 counts up and stacks 70 one-dollar [bils] *bills*, at which time the supply of bills to be counted in hopper 14 is exhausted. Whereas the stripper, drive, picker, acceleration and picker wheels will continue to rotate, no further count will be developed within the counter of the electronic control means and therefore the count of the bills already counted and stacked will remain undisturbed. The operator need only place a fresh stack of one-dollar bills in infeed hopper 14 whereupon the counting operation will continue as is described hereinabove.

Turning now to a description of the electronic control means for reliably and accurately operating the document-handling device, FIG. 3 shows the document detector 300 which is comprised of a light-sensitive transistor 72. The emitter is activated when a gap between separated documents is detected. The collector of transistor 72 is coupled to a d.c. source +V while the emitter electrode is coupled through resistor R1 to ground bus 301. The emitter is also connected through lead 302 to the base of transistor 303 whose collector is coupled through resistor R2 to the d.c. source +V. The emitter electrode of 303 is coupled through capacitor C1 to ground bus 301 and through resistor R3 to one input 304b of an operational amplifier 304 which is utilized in circuit 300 as a comparator. Resistor R3 is further coupled through resistor R4 to ground bus 301. The emitter electrode of light-sensitive transistor 72 is further coupled to the remaining input 304a of operational amplifier 304.

In the quiescent state, i.e., when no "gap" is sensed, transistor 72 is in the non-conductive state so that its emitter electrode will be at ground potential thereby applying a ground potential to the base of transistor 303. The emitter of transistor 72 thus applies ground potential to input 304a of comparator 304. The ground potential applied to the base electrode of transistor 303 maintains 303 in the non-conductive state.

Resistors R3 and R4 form a voltage divider whose output point is the common terminal 305 therebetween. Resistor R4 has a substantially high resistance value of the order of 100 K Ohms which preferably is greater than the resistance value of resistor R3.

Before describing the operation of the detector 300, a brief description of the characteristics of the circuit and the problems which the circuit solves will first be given.

In the handling of documents at high speed, it can be appreciated that a significant amount of dust is created in such high speed paper or document handling. The dust particles eventually come to rest upon various components of the document handler, including, but not limited to, the light source 65 and the ight-sensitive surface of transistor 72. Dust will be accumulated gradually and after long periods of time, for example, of the order of days or weeks, such accumulations will significantly reduce the amount of light emitted by light source 65 and the amount of light which can pass through dust accumulated upon the light-sensitive surface of transistor 72. Therefore, the threshold level above which a pulse developed by transistor 72 will be detected as a "gap" and below which threshold level an output pulse will not be detected as a "gap" will, if the threshold level is maintained constant for long periods of operation, result in the erroneous detection. The threshold level selected is a compromise between the maximum output level of the light-sensitive transistor and an output level of the light-sensitive transistor which will occur as a result of passage of light through documents which, while not being transparent, are nevertheless translucent and will permit some portion of the light from source 65 to be transmitted through the document. The threshold level will thus be adjusted accordingly dependent upon the light transmitting characteristics of the documents or sheets to be handled by the device 10 of FIG. 1.

Other physical conditions which tend to affect the sensitivity of the detector device are heat and general deterioration of the circuit components. The effects of these physical occurrences are to gradually reduce the sensitivity of the detector until after a time period of sufficient length, a reduction in the sensitivity of the light-sensitive transistor in conjunction with maintenance of an absolutely constant threshold level will cause a detector to provide an erroneous output. It is therefore extremely important to provide a detector device with self-compensating means for adjusting the threshold level to accommodate for such gradual changes in detector sensitivity.

Figure 5A:
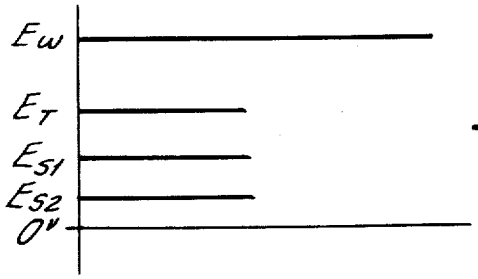
FIGS. 5a–5c show waveforms useful in explaining the circuitry of FIGS. 3 and 4a–4f.

Let it be assumed that the device 300 of FIG. 3 is operating under ideal conditions in that light source 65 and light-sensitive transistor 72 are free of any dust or dirt particles and that light source 65 is operating to emit light of its maximum intensity capacity. Impingement of light upon the photo-sensitive emitter of transistor 72 causes the transistor to conduct, establishing a conductive path between the positive source +V and ground bus 301. A voltage drop is thus developed across resistor $R_1$ having a voltage level $E_w$ (see FIG. 5a). Let it be assumed that the voltage of source +V is 5 volts d.c. and that the voltage drop across transistor 72 when conducting is so small as to be negligible. Thus, resistor $R_1$ will develop a voltage drop of 5 volts across its terminals representative of the maximum "white" condition $E_w$.

A +5 volt level at the emitter of transistor 72 is thus applied to the base electrode of transistor 303 causing the transistor to conduct so as to charge capacitor $C_1$ at a very rapid rate. The +5 volt d.c. level ($E_w$) is also applied to input terminal 304a of comparator 304 for comparison against the "threshold level" in a manner to be more fully described.

Capacitor C1 charges at a rapid rate to develop a voltage $E_c$ due to its coupling to the emitter of transistor 303 so as to charge to the level of +5 volts d.c. The voltage [dividier] *divider* network comprised of resistors $R_3$ and $R_4$ develops a voltage $E_t$ at terminal 305 which represents the threshold level against which the output voltage level $E_w$ will be compared. In the example given hereinabove, this level will be of the order of 3⅓ volts. Operational amplifier 304 functions to generate a positive output level whenever the voltage level at its input 304a exceeds the voltage level at its input 304b. In the particular example, $E_w$ is greater than $E_t$ causing a positive level to be developed at output 304c.

It should be understood that the resistances $R_3$ and $R_4$ may be made adjustable so as to adjustably select the threshold level $E_t$. For example, let it be assumed that a sheet having some light transmissive properties passes between light source 65 and light-sensitive transistor 72 (see sheet S' in FIG. 3). Some light will pass through sheet S' causing transistor 72 to partially conduct whereby the output level at its emitter electrode will be a level equal to or less than $E_t$ level established during the previous gap. This level will be sufficient to drive transistor 303 into conduction to charge capacitor $C_1$ and develop a threshold level which preferably should be greater than the level at the emitter of 72 to cause comparator 304 to be prevented from developing a positive level. It is obvious therefore that the threshold level $E_t$ must be sufficiently greater than the lever $E_{s1}$ so as to prohibit light passing through a light transmissive, or partially light-transmissive (i.e., translucent) document from being erroneously detected as a "gap" between the two documents.

The self-compensating feature of the circuit is obtained as follows:

As was previously mentioned, resistor $R_3$ and $R_4$ have resistive values which collectively are relatively high so that the sums of these resistances are of the order of greater than 100,000 Ohms to provide a relatively long time constant for the discharge of capacitor $C_1$ as will be more fully described hereinbelow.

The sheets being handled by the document handler 10 of FIGS. 1 and 2 are preferably moved at a rate of the order of 60 inches per second. Assuming the length of a document measured in the feed direction to be of the order of 3 inches, the movement of the document in passing between light source 65 and light sensitive transistor 72 will be of the order of 50 milliseconds. Considering FIG. 5c, let it be assumed that at time $t_0$ the leading edge of a document S' moves between light source 65 and light sensitive transistor 72. At this time the voltage output at the emitter electrode of transistor 72 will be at $E_{s1}$ (assuming that the document is partially light transmissive as opposed to opaque) and will allow some light to pass therethrough. The output at the emitter electrode of transistor 72 will be at the level $E_{s1}$ which level is applied to input 304a of comparator 304. Due to the low discharge rate of capacitor $C_1$ (to be more fully described) the level at terminal 305 of the voltage divider network will be at $E_t$ which level is applied to input 304b of comparator 304, thus causing the output 304c of comparator 304 to assume ground (0) level.

At time $t_1$ the trailing edge of document S' will pass out of the region between light source 65 and light-sensitive diode 72 causing resistor 72 to go fully conductive and develop a voltage level $E_w$ at its emitter electrode. Simultaneously therewith voltage $E_w$ is applied to the emitter electrode of transistor 303 causing capacitor $C_1$ to rapidly charge approximately the level of $E_w$. The voltage divider applies a threshold voltage level $E_t$ to comparator 304. Since the level $E_w$ is greater than the level $E_t$, comparator 304 assumes a positive level thereby detecting the presence of a "gap" between document S' and the next document S''. The level $E_w$ is retained at the emitter electrode of transistor 72 until the leading edge of sheet S'' moves into the region between light source 65 and transistor 72 at time $T_2$ causing the conductive state of transistor 72 to be significantly reduced thereby dropping to the level $E_{s1}$ and causing $C_1$ to discharge very slightly. This level will be sustained until time $t_3$ when the trailing edge of document S'' leaves the region between light source 65 and transistor 72 and before the leading edge of the next document (not shown for purposes of simplicity) enters into the aforesaid region.

At time $t_2$ when the output level at the emitter electrode of transistor 72 abruptly drops to level $E_{s1}$, the voltage resistance values of resistors $R_3$ and $R_4$ and the capacitance of capacitor $C_1$ causes $C_1$ to discharge at a very slow rate. For example, in one preferred embodiment, the value of capacitor $C_1$ and of resistors $R_3$ and $R_4$ is such as to cause capacitor $C_1$ to be fully discharged over a time interval of the order of 500 milliseconds. Since the time between the passage of each document is of the order of 50 milliseconds, capacitor $C_1$ discharges at a rate such that the voltage across its terminals is close to 90 percent of the voltage $E_t$.

Figure 5B:
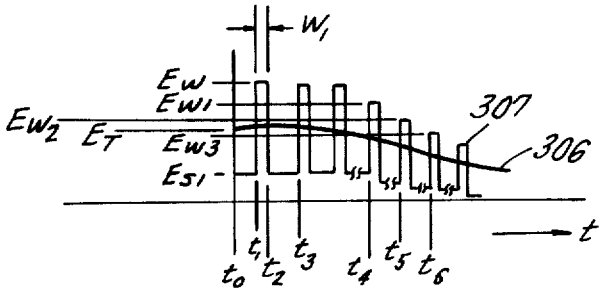

Let it be assumed that over the passage of time, a gradual change occurs in the maximum output level at the emitter electrode of transistor 72 due to such conditions as the collection of dust or the effect of heating of the components through long continued use. It can be seen from FIG. 5b that the level $E_w$ will gradually decrease to a level $E_{w1}$ at time $t_4$, to level $E_{w2}$ at time $t_5$ and to level $E_{w3}$ at time $t_6$ and so forth. Each of these reductions in the output level of emitter electrode of transistor 72 consequently reduce the voltage applied to the base electrode of transistor 303 causing capacitor $C_1$ to charge to a correspondingly lower value, thereby dropping the threshold level $E_t$ accordingly, as shown by curve 306 in FIG. 5b. It can thus be seen that the detector 300 of FIG. 3 automatically adjusts the threshold level $E_t$ in accordance with gradual changes in the output voltage level of transistor 72. It should be understood that waveform 307 of FIG. 5b shows a series of pulses which occur over a substantial elapsed time which may be of the order of days or weeks.

Figure 5C:
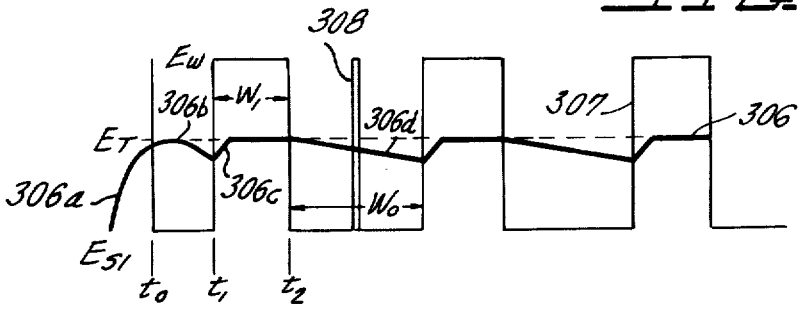

FIG. 5c shows a portion of waveforms 306 and 307 in greatly enlarged fashion to more clearly explain the operation of capacitor $C_1$ and the voltage divider network comprised of resistors $R_3$ and $R_4$. Let it be assumed that the document feeder is turned on. At this time, since no documents have been fed into the unit, light source 65 causes the capacitor $C_1$ to charge rapidly as shown by portion 306a of waveform 306. At time $t_0$ the first document passes through the region between lamp 65 and transistor 72 causing the output level of the emitter electrode of transistor 72 to drop to the voltage level $E_{s1}$. At this time, capacitor $C_1$ will discharge at a slow rate as shown by the waveform portion 306b where capacitor $C_1$ will drop to a voltage level of the order of 90 percent of its maximum voltage [$E_t$] $E_w$. At time $t_1$, the trailing edge of the document will move out of the region between lamp 65 and transistor 72 causing the output level of transistor 72 to go to $E_w$. At this time capacitor $C_1$ will charge to its full value in a very brief time period as shown by the portion [306b] *306c* of waveform 306. Capacitor $C_1$ will become fully charged and remain at the level $E_t$ until time $t_2$ at which time the leading edge of the next document moves into the region between elements 65 and 72 causing the output level at the emitter electrode of transistor 72 to drop to the level $E_{s1}$. At this time the capacitor will again discharge at a very slow rate as is represented by the portion 306d of waveform 306. This operation is continuously repeated in the same manner as was described hereinabove for each additional "gap" sensed between the documents being handled by the device 10. As the gradual build-up in dust or heating effects reduces the sensitivity of transistor 72, the output level $E_w$ will gradually be reduced as was described hereinabove causing capacitor $C_1$ to charge to a lower voltage level due to the reduced voltage applied to the base electrode of transistor 303. Thus, the threshold level $E_t$ will continue to be gradually reduced, *as represented by curve 306*, but will remain at a level which remains proportional to the maximum output level $E_w$, $E_{w1}$, $E_{w2}$ and so forth, as the sensitivity of transistor 72 is gradually reduced. It can thus be seen that the detector of FIG. 3 fully compensates for any gradual changes in the sensitivity of the detector.

Comparator 304 is designed so as to develop an output level of zero volts during the time when the document is passing in the region between elements 65 and 72 and is adapted to develop a positive output level of the order of +5 volts during the time that a gap is detected.

To enhance the flexibility of the document-handling device 10 so as to accommodate all sorts of documents and/or sheets it is important to provide means for preventing an erroneous indication of the presence of a "gap". For example, let it be assumed that the document-handling device 10 is being employed to count punch-cards. Some of the holes punched in the punch-cards may be positioned so as to coincide with the positions of light source 65 and transistor 72 causing the output pulse or spike such as the spike 308 shown in FIG. 5c to be developed. Since this pulse will reach the level $E_w$ which is clearly above the threshold level $E_t$ of waveform 306 (see waveform portion 306d), comparator 304 at this time will develop an output level of +5 volts to indicate the presence of a "gap". Another possible way in which such a narrow pulse may be developed may result from perforations, cuts, slits or tears which may appear in a document either for deliberate reasons or because the document has become torn or multilated through handling. Such narrow pulses must therefore be prevented from being interpreted as a "gap" between adjacent documents separated by the document-handling device 10.

Figure 4A:
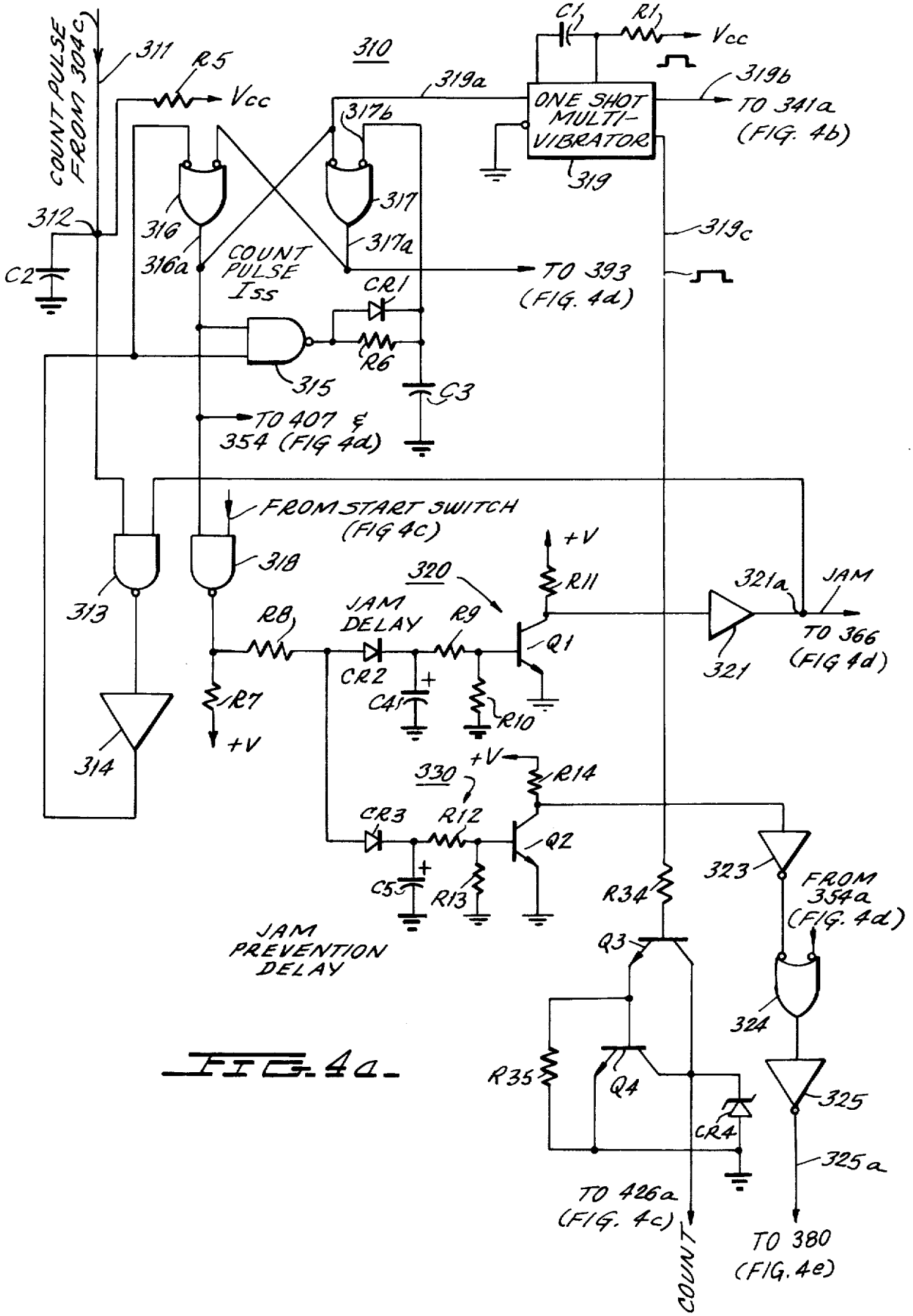

As was discussed hereinabove, the elapsed time $t_1$-$t_0$ represents the time between which the leading edge of a document enters into the region between elements 65 and 72 and the time at which the trailing edge of the documents leave the aforesaid region. The circuit 310 which prevents such narrow impulses from being erroneously interpreted as a "gap" between documents is shown in FIG. 4a and is comprised of an input terminal 311 coupled to the output 304c of comparator 304 for receiving count pulses. Series connected capacitor $C_2$ and resistor $R_5$ are coupled in series between +5 volts d.c. and ground with their common terminal 312 coupled to input line 311 which is coupled to the output of comparator 304. $C_2$ and $R_5$ provide filtering against high frequency noise such as that generated by motors, etc. which may be magnetically coupled into line 311. Input line 311 is coupled to one input of NAND gate 313. The operation of NAND gate 313 is such as to develop a high voltage level when any one or more of its inputs are low and to develop a low level when all of its inputs are at a high level. The output of NAND gate 313 is coupled to one input of inverter 314 whose output is simultaneously coupled to one input of NAND gate 315 and one input NOR gate 316. NOR gates 316 and 317 are cross-coupled to form a "single shot filter" circuit (SS-Filter) which operates in a manner to be fully described. The output of NOR gate 316 is coupled to one input of NOR gate 317 while the output or NOR gate 317 is coupled to the remaining input of NOR gate 316. The output of NOR gate 316 is further coupled to one input of NAND gates 315 and 318 and to the input 319a of a one-shot multivibrator 319. The remaining input of NOR gate 317 is coupled to one terminal of capacitor $C_3$ whose opposite terminal is coupled to ground. Parallel connected diode $CR_1$ and resistor $R_6$ are coupled in parallel between the output of NAND gate 315 and capacitor $C_3$. The output of NAND gate 318 is simultaneously coupled to the d.c. supply terminal +V through resistor $R_7$ and through resistor $R_8$ to the jam-delay and jam-prevention delay circuits 320 and 330, to be more fully described.

The jam-delay circuit 320 is comprised of diode $CR_2$ and capacitor $C_4$ for developing a rectified and filtered d.c. level at their common terminal. A potential divider comprised of resistors $R_9$ and $R_{10}$ applies a portion of this voltage to the base of transistor $Q_1$ whose collector is connected to the d.c. +V through resistor $R_{11}$ and whose emitter is connected to ground. The collector is coupled to the input of inverter 321 whose output is coupled to the remaining input of NAND gate 313.

The jam-prevention delay circuit 330 is similar in design to the jam-delay circuit 320 and is comprised of diode $CR_3$ and capacitor $C_5$ for rectifying and filtering the input applied thereto. Resistors $R_{12}$ and $R_{13}$ operate as a voltage divider coupling a portion of the output voltage appearing at the common terminal between diode $CR_3$ and capacitor $C_5$ to the base electrode of transistor $Q_2$ whose emitter is connected to ground and whose collector is coupled to +V through resistor $R_{14}$.

During the time when no counting is being performed a portion of the d.c. level is applied to the emitter of transistor $Q_1$ causing $Q_1$ to conduct. At this time the collector of $Q_1$ will be low (substantially zero volts) causing the output of inverter 321 to go high, thereby placing a high level at one input of NAND gate 313. In the absence of any counting the output of comparator 304 is high placing a high level at the other input of NAND gate 313 causing its output to go low, which condition is reversed by inverter 314 to apply a high input to one input of NOR gate 316 and NAND gate 315. The output of NOR gate 316 is low applying a low level to one input of NOR gate 317. This causes the output of NOR gate 317 to go high which level is applied to the remaining input of NOR gate 316 to cause its output to go low. The presence of high and low inputs to NAND gate 315 causes its output to go high to apply a high level signal to the remaining input of NOR gate 317 causing the output of 317 to go low. This condition is sustained due to the cross-coupling of NOR gates 316 and 317 to apply a low level input to one-shot multivibrator 319. Let it now be assumed that a document enters into the region between light source 65 and transistor 72. This causes a low input to be applied to lead 311, causing the output of gate 313 to go high. This condition is reversed by inverter 314 to apply a low level to one input of NOR gate 316. This causes the output of gate 316 to go high which, in turn, applies a high input level to NOR gate 317 and to NAND gate 315. The output of NAND gate 315 goes high causing capacitor C3 to charge rapidly to the high level through diode CR1 and causing the output of NOR gate 317 to go low. This low level is applied to the remaining input of NOR gate 316 causing its output to remain high. This high level signal is applied to input 319a of one-shot multivibrator 319 to cause an output pulse of a predetermined pulse width to be developed at output terminal 319b. Simultaneously therewith, a positive going pulse is developed at the remaining output 319c of one-shot multivibrator 319 which is applied to a circuit comprised of transistors $Q_3$, $Q_4$ and Zener diode $CR_4$ for developing an output at the collector electrode of $Q_4$ employed to advance an electromagnetic counter means (FIG. 4c) by one count.

As was described hereinabove, the output of comparator 304 remains at the low level for the duration of the passage of a document which is of the order of 50 milliseconds, after which time the level at lead 311 abruptly increases to +5 volts d.c., causing the output of gate 313 to go low and the output of inverter 314 to go high returning a high level to gates 316 and 315. The output of gate 315 thus goes low. However, the capacitance of capacitor $C_3$ and the resistance value of resistor $R_6$ are chosen to cause capacitor $C_3$ to discharge at a slow rate whereby the high level at the terminal of capacitor $C_3$ coupled to one input of NOR gate 317 is retained thus preventing the bistable circuit comprised of NOR gates 316 and 317 changing state and thereby preventing an erroneous pulse from being applied to one-shot multivibrator 319 until capacitor $C_3$ has had sufficient time to discharge. The discharge rate of capacitor $C_3$ is appropriately adjusted so as to permit the capacitor to fully discharge during a 20 millisecond time duration which lies well within the normal time interval of a "gap" but is adjusted to prevent the capacitor from being discharged within shorter time intervals which would occur as a result of holes, tears, or other multilations in the document passing betweeen lamp 65 and detector (transistor 72).

When the output of NOR gate 316 goes high, gate 318 is caused to develop a low level output to permit capacitor $C_4$ in the jam-delay circuit 320 to begin discharging. The time interval during which capacitor $C_4$ will be fully discharged is of the order of 100 milliseconds which is greater than the time required for the passage of one sheet through the region between lamp 65 and transistor 72 so as to maintain a high level output at the remaining input of gate 318. Once an amount of time has elapsed which is greater than the time required for one document to pass through the sensing region without the detection of a "gap", the output of inverter 321 goes low to cause the input of gate 313 coupled thereto to go low and thereby prevent the count discriminating circuit 310 from generating any further count pulse.

Summarizing the operation of the circuits 300 and 310 of FIGS. 3 and 4a, the objective of these circuits is to distinguish between a "gap" between the trailing edge of a document and the leading edge of the next document, as they pass the sensor 72, and the presence of holes or tears within the body of a document, so that such "holes" will not be erroneously interpreted as a "gap" so that to prevent an erroneous count pulse from being generated. This problem is extremely important in the counting of documents which have punched codes provided therein.

Let it be assumed that the trailing edge of a document has just passed sensor 72 (FIG. 3). Just prior thereto, capacitor $C_3$ (FIG. 4a) has been fully charged. The output of comparator 304 (FIG. 3) goes high. The output of gate 313 and inverter 314 go low and high respectively. The count pulse $I_{SS}$ is latched with 316a high, applying a high to one input of 315. Since the output of inverter 314 is high, the output of gate 315 goes low causing $C_3$ to discharge. When $C_3$ discharges to a level below the reset threshold level of reset input 317b of the single shot (SS) gate 317, this causes the output 317a to go high. This causes the output 316a of 316 to go low. The interval of elapsed time typically required for $C_3$ to discharge from a full charge (approximately 5 V.d.c.) to the reset threshold level (approximately 0.8 V.d.c.) is of the order of 10 milliseconds. In this time interval assuming a rate of movement of documents as 60 inches per second, the trailing edge of the last document will have travelled a distance of the order of 0.60 inches.

Since the nominal gap distance between documents is of the order of 0.70 inches, the leading edge of the next succeeding document will not have arrived at sensor 72. Since the reset level has been reached by the discharge of $C_3$ and the output 317a has gone high, the output of gate 315 goes high causing $C_3$ to begin charging before the leading edge of the next document is detected by sensor 72. Once the leading edge is detected the output of 304 goes low causing the output of 313 to go high and the output of 314 and the input 316b of 316 to go low whereby the output 316a of 316 goes high, which is applied to one input of 317 and 315. However, the low output of 314 is applied to the remaining input of 315, thereby maintaining a high output of 315, thus $C_3$ continues to charge and becomes fully charged well before the next trailing edge passes sensor 72 (see the waveform of FIG. 5c, for example). The above operations are then repeated for each succeeding document.

The presence of a punched hole in a passing document which punched hole may be located in the region of sensor 72, causes the output level of comparator 304 to go high. However, the typical length of a punched hole is of the order of 0.125 inches. With the document travelling at a rate of 60 inches per second the "hole" will pass the sensor in about 1 millisecond during which time $C_3$ has discharged only slightly and will be at a voltage level well above the threshold level of the reset input 317b. Thus, $I_{SS}$ will not reset. The circuit will also prevent resetting even though an entire column of punches (typically there are a maximum of 12 positions in a column) will not cause $C_3$ to drop below the reset threshold level. Mutilations or holes of types other than punches holes and are of the order of 0.50 inches or less in the direction of movement can thus be prevented from being interpreted as a "gap". There is no maximum length of a gap between trailing and leading edges of successive documents. However, the minimum length of a gap is dictated by the minimum response of the circuitry and should preferably be of the order of 0.40 inches.

Jam-prevention delay circuit 330 operates in a similar fashion such that its one input terminal is coupled to +5 volts while its remaining input terminal is coupled to the output of NOR gate 136. When the presence of a document is sensed the remaining input of NAND gate 318 goes high causing its output to go now enabling capacitor $C_5$ to begin discharging. If the output of NAND gate 318 does not go high during a time slightly greater in time duration than the time in which the document should be present, capacitor $C_5$ will discharge causing the output of transistor $Q_2$ to go high. This condition is inverted by inverter 323 and applied to one input of NOR gate 324 whose other input is derived from gate 354 of FIG. 4d which functions to provide a low level signal at the input of NOR gate 324 to cause the output of NOR gate 324 to go high. This condition is inverted by inverter 325 to apply a low level signal to the input of NOR gate 380 shown in FIG. 4e to cause the electromagnetic brake and clutch mechanisms to be operated in the manner previously described to thereby prevent any further sheets from being fed into the document-handling device to prevent the occurrence of a serious jam in the mechanism, or alternatively to halt or slow down the document-handling device during batching or statistical sampling operations.

FIG. 4b is a schematic diagram showing the electronic counter and selector switch of the control device. The electronic counter 340 is comprised of units, tens and hundred counting stages 341, 342 and 343 electrically interconnected so as to be capable of developing a binary count representative of any decimal quantity from 000 through 999. The electronic counter accumulates one count each time it is triggered by a square pulse developed at the output 319b of one-shot multivibrator 319. This is applied to input terminal 341a of units stage 341.

Each of the units, tens and hundreds stages further includes input means coupled to appropriate input terminals in each of the stages 341, 342 and 343 which are coupled to settable thumbwheel switch assemblies mounted at the control panel 13 of the document-handling device 10 (see FIG. 1). The thumbwheel switches 344 (units), 345 (tens), and 346 (hundreds) are each provided with a number wheel visible at the control panel of the device 10 to provide a visually observable indication of the position of each of the thumbwheels for indicating a count of any decimal number from 000 through 999. The mechanical arrangement for the thumbwheels and number wheels have been omitted for purposes of simplicity. The mechanical thumbwheel switches selectively couple a high voltage level to each of the input leads, for example, leads 344a–344d of the units thumbwheel switch, which couple the high level voltages to associated inputs of the units counter and comparator 341.

The thumbwheel switches provide outputs in "nines complement" form which significantly simplifies the electrical connections required in the electronic counter as will be more fully described. A typical example of nines complement is set forth in the text "Programming Business Computers" published by John Wiley & Sons, 3rd printing, Apr. 1962, on pages 449 and 450.

Effectively, in nines complement, the value of each decimal digit is subtracted from the decimal quantity "9" and a binary coded decimal "9" is, in the "nines complement" form, a decimal 9 which is interpreted as a binary coded decimal zero. The binary coded decimal form of decimal 9 is 1001 where the weighting of the binary digits from left to right is "8", "4", "2" and "1".

The manner in which the electronic counter 340 functions is set the thumbwheel switches 344–346 so that their associated number wheels (FIG. 4c) indicate the desired batch size. However, the wiring between the thumbwheel switch settings and the inputs to the units, tens and hundreds stages 341–343, respectively, is a binary coded decimal and "nines complement" form. For example, let it be assumed that the size of the batch is to be fifty sheets. In this particular case the hundreds, tens and units thumbwheels will be set so that the decimal numbers respectively read 050. The input levels applied to the units, tens and hundreds electronic counter stages 341–343 respectively, will be in binary coded decimal nines complement form and will read 1001; 0100; and 1001, with the left-handmost digit of each binary coded decimal group being the most significant binary bit position.

The use of the "nines complement" form reduces the number of output connections from each of the electronic counter stages to two (2) output levels per counter, namely the decimal eight and decimal one outputs respectively. In the units stage, the decimal eight and decimal one outputs are terminals 341b and 341c, respectively, and hence the hundreds outputs are similarly labeled as 342b and 342c and 343b and 343c respectively.

The output of each counter stage, in binary coded decimal "nines complement" form is 1001, which is the equivalent of a 0000 reading in straight binary coded decimal form. However, the straight binary coded decimal (BCD) form would require a connection of all four output stages to the peripheral logic circuitry whereas in the present arrangement only two output connections are required from each stage to sense the nines complement decimal "9" condition.

The outputs 342b and 343d in "tens" stage 342 and the outputs 343b and 343d in "hundreds" output stage 343 are all coupled to associated inputs of AND gate 349 which provides an output when the binary coded decimal nines complement output of each of the stages 342 and 343 are simultaneously in the form 1001. This output is inverted by inverter 350 whose output 350a is coupled to input lead 351 shown in FIG. 4c which is a schematic diagram showing the various switches and other controls provided in the operator's panel 13 of FIG. 1.

Lead 351 is coupled to one stationary terminal 352a of a batch/statistical sampling switch 352 provided with a second stationary terminal 352b and a movable switch arm 352c. When the movable switch arm 352c engages stationary contact 352a, the high output from inverter 350 is simultaneously coupled through lead 353 to one input of each of the AND gates 354, 355 and 356 shown in FIG. 4d.

AND gate 354 has its remaining inputs coupled to the decimal "8" output 341b of units counter stage 341 (FIG. 4b) and the output 316a of NOR gate 316 which forms the Single Shot Filter circuit (SS-Filter) with NOR gate 317 (FIG. 4a). AND gate 354 provides an output at 354a which is low when all of its three inputs are high indicating the units stage of the electronic counter has reached a decimal "8" state, that the tens and hundreds stages have each reached a decimal "9" state and that the output of NOR gate 316 is high indicating that the leading edge of the 49th" sheet has been sensed. This output is coupled to NOR gate 324 which provides a high output when the output of gate 354 or AND gate 354 is low (see FIG. 4a). This condition is reversed by inverter 325 to place a low input level at NOR gate 380 of FIG. 4e for controlling the operation of electromagnetic brake 137 and clutch 131 in a manner to be more fully described. The specific actuation of the electromagnetic brake and clutch in accordance with the logical gating circuitry of FIG. 4a will be described in greater detail hereinbelow.

AND gate 355 has its remaining inputs coupled respectively, to the decimal "8" output 341b of the units electronic counter stage 341 and the output 317a of NOR gate 317 of FIG. 4a and provides a low level output when the tens and hundreds counter stages are each in the decimal "9" state, when the unit stage output 341b is high (indicating a decimal "8") and when the output of inverter 317 is high (indicating the absence of a document). This low level output is coupled to one input of an NOR gate 357 which is cross-coupled with NOR gate 358 to form a flip-flop (Gate FF). The output 357a or NOR gate 357 is coupled to one input of NOR gate 358 while the output 358a of NOR gate 358 is coupled to the remaining input of NOR gate 357. The remaining inputs of NOR gate 358 are coupled to the start switch 385, (FIG. 4c) through gates 373 and 374 (FIG. 4e) and to lead 361 of FIG. 4c which is coupled to the stationary terminal 362a of statistical sampling switch 362 further comprising a movable switch arm 362b and stationary contact 362c (see FIG. 4c). Movable switch arm 362b is coupled to grounded bus 363 to couple ground potential (i.e. low level) to the associated input of gate 355 when in the statistical sampling mode. Movable switch arm 362b is ganged to the movable switch arm 364b of batch switch 364 further comprising stationary contacts 364a and 364c respectively. The ganged connection is represented by dotted line 364 such that when one of the switch arms (for example, switch arm 362b) is in the upper position engaging its stationary contact 362c, the remaining switch arm (for example, switch arm 364b) will engage its upper stationary contact 364c.

Thus, when the document-handler is in the statistical sampling mode, AND gate 355 will provide a low output when the units and tens stages are both in the decimal "9" state when the unit stage is in the decimal "8" state and when the output of NOR gate 317 is high indicating the absence of a document thereby providing a low level input at NOR gae 357. This causes the output 358a of NOR gate 358 to go low, thereby applying a low level input to NOR gate 412 of FIG. 4f which functions to develop a "gate" signal in a manner to be more fully described.

The sequence of batch completion is such that, AND gate 356 has its output go low when the units counter stage 341 is in decimal "9" and when the tens and hundreds stages are also in the decimal "9" state causing its output to go low thereby applying a low level to NOR gate 366 whose other input is coupled to the output 321a of inverter 321 (see FIG. 4a) which is high so long as jam-delay circuit 320 is not timed out. The output of gate 366 goes high and is inverted by inverter 367 to apply a low level output to lead 368 which is coupled to stationary contact 364c of switch 364. When this switch is in the closed position, the low level is coupled through switch arm 364b and lead 369 to 376a of NOR gate 376 of FIG. 4e which operates in conjunction with gate 375 to form the RUN flip-flop which controls electromagnetic clutch 131, electromagnetic brake 187, Motor M, and indicator 389 in a manner to be more fully described.

Gate 370 and inverter 372 (FIG. 4d) have their inputs coupled to the output 321a (see FIG. 4a). The output of inverter 372 is coupled to the base electrode of transistor $Q_5$ and normally maintains transistor $Q_5$ non-conductive until the jam-delay circuit 320 times out, at which time the output of inverter 321 goes low causing the output of inverter 372 to go high and render transistor $Q_5$ conductive. Its collector electrode is coupled to lead 390a of FIG. 4c to light the jam indication lamp 391.

The remaining input of gate 370 is coupled to the output 376a of NOR gate 376 which is low when the Start button of the control unit is depressed. Thus, if the start button has been depressed, the output of gate 370 is high causing the output of inverter 371 to go low so as to render transistor $Q_6$ non-conductive. The collector output of transistor $Q_6$ is coupled through lead 388 to "batch complete" lamp 389 of FIG. 4c causing the lamp to be extinguished when a batch has not been completed.

Figure 4D:
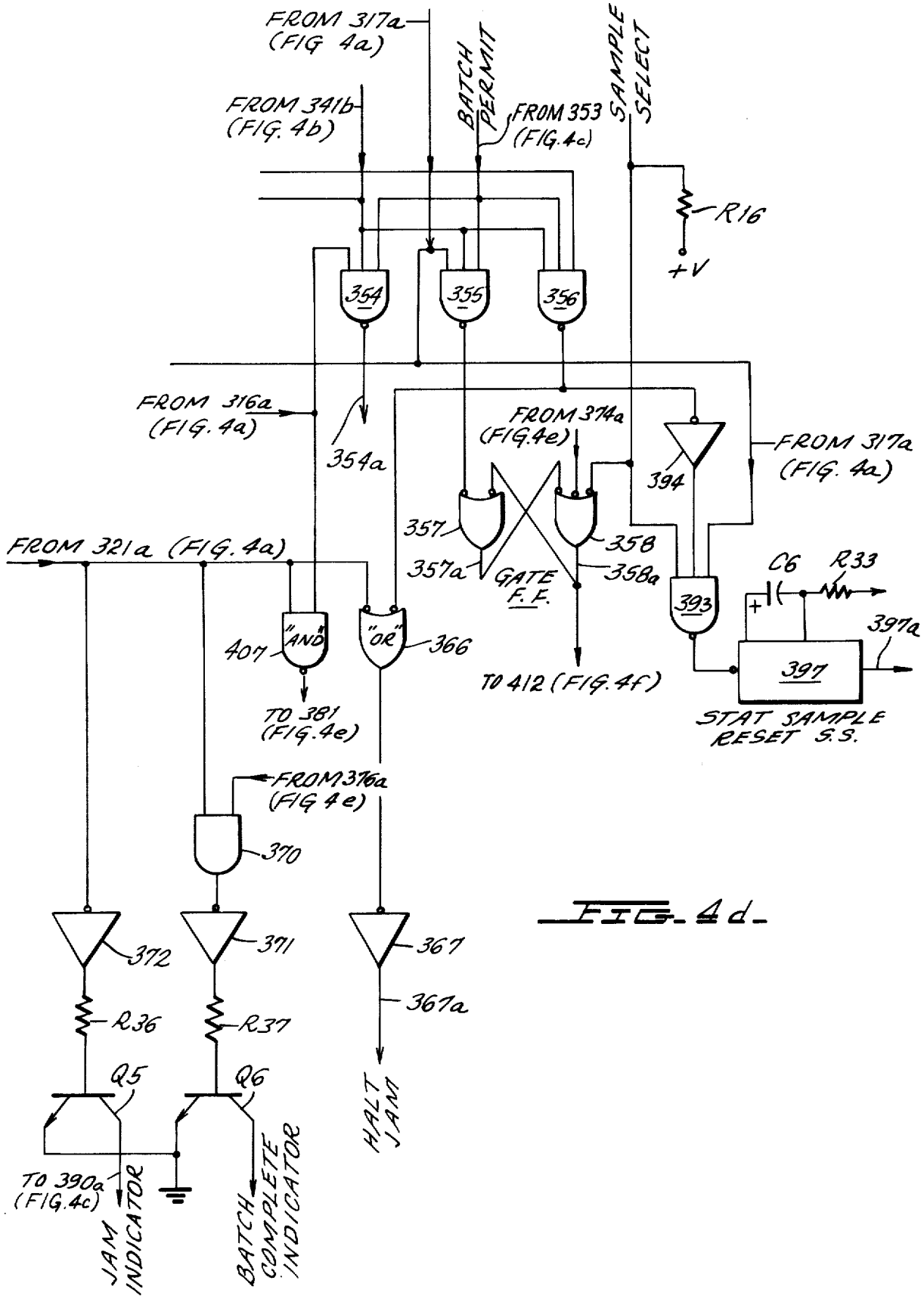
Figure 4C:
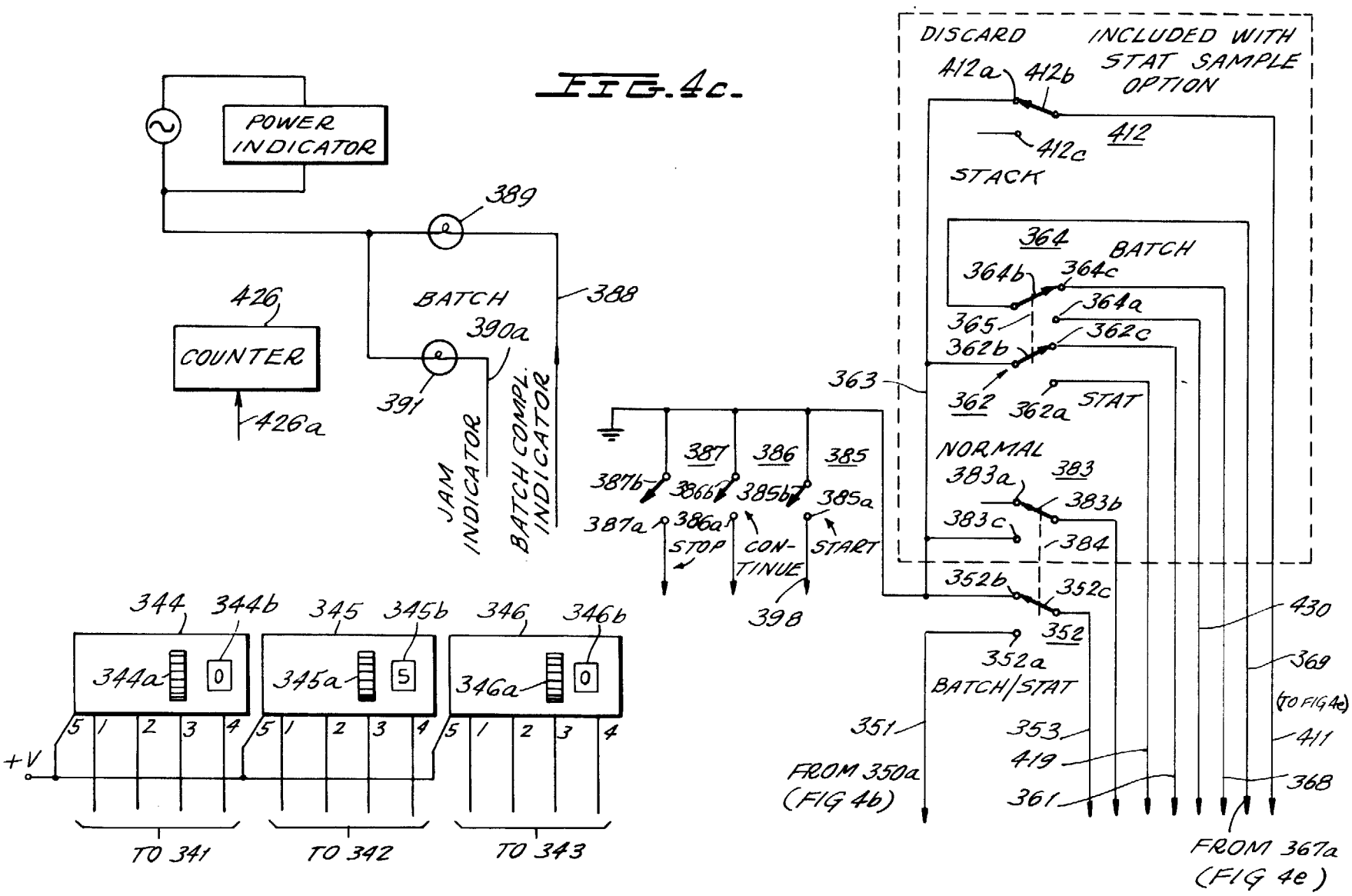

AND gate 393 of FIG. 4d has one of its inputs coupled to lead 361 of FIG. 4c which, in turn, is coupled to the statistical sample switch 362. A second lead is coupled through inverter 394 to the output of AND gate 356 while the remaining lead is coupled to the output 317a of NOR gate 317 (see FIG. 4a) so as to develop a negative going output when the count pulse is high signifying that a document is not present in the counting region of gate 201 (FIG. 1a), when all stages of the electronic counter are in the decimal "9" state and when the sample select switch is in its upper position. This negative going signal is applied to the input of single shot 397 producing a negative pulse.

The output of gate 356 is simultaneously coupled to one input of OR gate 366 and inverter 394. The output of OR gate 366 is coupled to inverter 367, whose output is coupled to batch switch 364 and via lead 369 (when the batch switch 364 is in its upper position) to one input of NOR gate 376 resulting in a high condition to AND gate 370 thereby rendering transistor $Q_6$ to be conductive so as to illuminate a lamp 389 indicating the completion of a batch.

When the inputs to gate 393 are all high, a negative going pulse is applied to one-shot multivibrator 397 which functions as a pulse widening device to apply an output pulse to one input of NOR gate 373 of FIG. 4e for a purpose to be described in more detail hereinbelow.

Figure 4E:
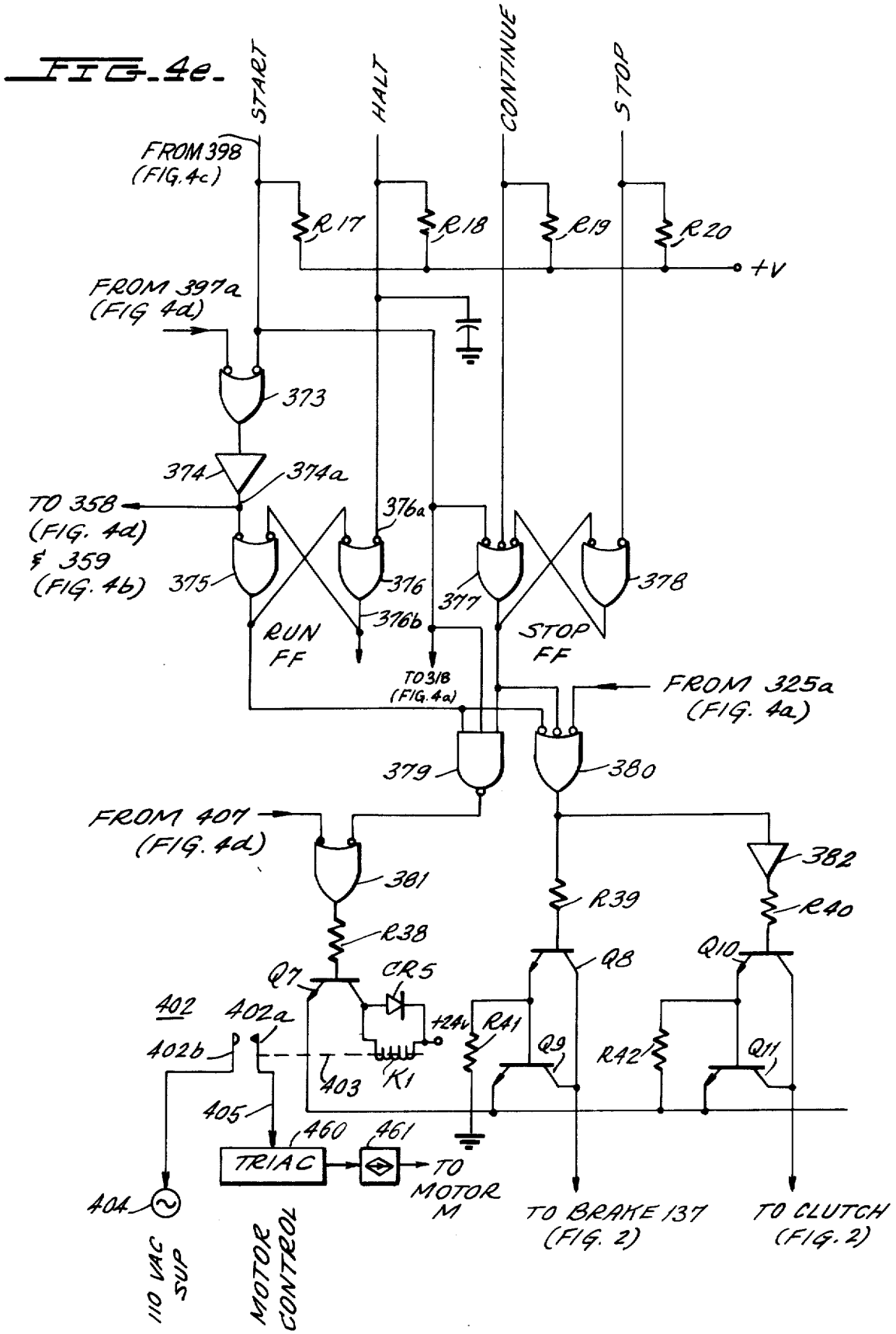

FIG. 4e is comprised of a NOR gate 373 having one input coupled to the output 397a of one-shot multivibrator 397 (see FIG. 4d) and the remaining input coupled to lead 398 of FIG. 4c which is coupled to the stationary contact 385a of start switch 385 which further comprises a movable switch arm 385d. This is a momentary switch device which may be depressed to close switch arm 385b. However, when the switch button is released, the switch arm 385b disengages from stationary contact 385a by suitable biasing means (not shown for purposes of simplicity). This condition (the depression of the start switch) places a low level to one input of NOR gate 373 causing it to go high which condition is inverted by inverter 374 causing one input of NOR gate 375 to go low. NOR gate 375, together with cross-coupled NOR gate 376, forms a bistable flip-flop circuit (RUN FF). The output of inverter 374 is also coupled to lead 359 of FIG. 4b.

Depression of the start switch causes the setting of thumbwheel switches 344–346 to be transferred to electronic counter 340, as will be further described. When the input of NOR gate 375 goes low, its output goes high causing a high input level to be impressed upon one input of NOR gate 376 whose output goes low when no halt condition is present. The high output of NOR gate 375 is coupled to one input of AND gate 379 whose remaining inputs are coupled to start switch 385 and the output of NOR gate 377 which is cross-coupled with NOR gate 378 to form a second bistable flip-flop circuit (STOP FF). The outputs of NOR gates 375 and 377 are both high when the counter is running and the start button has been depressed and subsequently released causing the output of AND gate 379 to go low, which condition is applied to NOR gate 381 causing its output to go high rendering transistor $Q_7$ conductive. This condition causes solenoid coil $K_1$ to be energized thereby causing switch arm 402a of switch 402 to engage stationary switch arm 402b. Switch arm 402a is magnetically coupled to solenoid $K_1$ as designated by dashed line 403. The closure of switch arm 402a couples the a.c. supply 404 to lead 405 which is coupled to the control gate of a speed control circuit 460 comprised of a triac assembly which controls the percentage of each half-cycle of the a.c. waveform to be delivered to bridge rectifier 462 to develop a d.c. output.

The function of gate 407 (FIG. 4d) is to control the energization of motor M which is controlled by the presence of a document under the sensor except during a jam condition. This insures feed-out of any document in flow when the STOP button is depressed and when the document is the last one of a batch. Gate 407 is low to keep relay $K_1$ energized so long as there is no jam condition (311a - FIG. 4a) and a document is passing the sensor.

Gate 381 also energizes relay $K_1$ either when the START button is depressed, or the RUN FF is ON or when the STOP FF is OFF (i.e., reset).

NOR gate 380 has its output go high when any one of its inputs are low causing a high input level to be applied to inverter 382 and to the emitter electrode of transistor $Q_8$. Thus, whenever the document-handling device is either not in the running state or is in the "stop" state or when the jam-prevention delay circuit has timed out its output goes high causing transistors $Q_8$ and $Q_9$ to become energized so as to apply an energizing signal to the electromagnetic brake 137 shown in FIG. 2.

The inverter 382 has its output coupled to the base electrode of transistor $Q_{10}$ which, together with transistor $Q_{11}$ is energized to energize electromagnetic clutch 131 when the output of inverter 382 goes high, which condition occurs as an inverse function of the $Q_8$ and $Q_9$ energization logic statement.

FIG. 4f is comprised of a gate 410 having one of its inputs coupled to lead 411 of FIG. 4c which is coupled to the movable switch arm 412b of switch 412 having stationary contacts 412a and 412c. Contact arm 412b engages stationary contact 412c when in the normal stacking state and engages contact 412a when the statistical sampling state. The remaining input to gate 410 is coupled to switch arm 383b of switch 383 which engages its upper stationary contact 383a when in the normal state causing the output of gate 410 to go low when both of its inputs are high (when in the normal and stacking state). This low condition is applied to one input of NOR gate 412 whose output goes high so long as one of its inputs is low to cause transistor $Q_{12}$ to conduct. This energizes coil $K_2$ causing switch arm 413a magnetically coupled to coil $K_2$ as represented by dash line 414 to apply a ground level potential to the gate output lead 415 which energizes solenoid 204 (see FIG. 1a) whose armature is mechanically linked to gate 201 driving gate 201 to the position which guides documents into stacker 80. Zener diode $CR_7$ serves to suppress excessive back-EMF when the relay $K_1$ contacts are subsequently opened.

FIG. 4f further comprises an inverter 416 whose input is coupled to the switch 383 which is low when in the statistical sampling position causing a high input to be coupled to one input of NAND gate 417, whose other input is coupled to lead 419 of FIG. 4c which, in turn, is coupled to the stationary contact 362a of the statistical sampling switch 362 which is high when switch arm 362b is connected to upper stationary terminal 362c causing the output of gate 417 to go low and thereby sustain the energization of relay coil $K_2$.

Returning to a consideration of FIG. 4c, there is shown therein the settable thumbwheel switches 344–346 each provided with a manually operated thumbwheel 344a–346a for setting its associated number wheel so as to set any decimal number (for units, tens and hundreds) at the windows 344b–346b, respectively. FIG. 4c, for example, shows a setting of 050 indicating a batch or statistical sampling count of 50. Thus, each batch will contain 50 sheets or, alternatively every 50th sheet will be statistically sampled.

The control panel is further provided with electromagnetic counter means 426 for indicating the count at any given instant for either a batch count or a continuous count. The pulsing input 426a is coupled to the collector electrode of transistor $Q_4$ shown in FIG. 4a. The operator's panel is further provided with a stop switch 387 having switch arm 387b and a stationary contact 387a. A continue switch having movable switch arm 386b and stationary contact 386a is also provided.

The modes of operation will now be described:

Let it be assumed that it is desired to count a large number of sheets. Switch arm 383b will be set in its upper position engaging stationary contact 383a for "normal" operation. Switch arm 412b will be in its lower position engaging stationary contact 412c to indicate a stacking operation.

When power is initially turned on, the Jam Detection Circuit 320 (FIG. 4a) times out and assumes the "JAM" state turning the "JAM" indicator lamp 391 on and resetting RUN-FF (FIG. 4e) through inverter 321, NOR gate 366 and inverter 367 (FIG. 4d) to NOR gate 376 (FIG. 4e). The RUN FF in the reset state keeps motor M off (through gates 379 and 381 and $Q_7$-FIG. 4e); brake 137 energized (through gate 380 and $Q_8$-FIG. 4e); and clutch 131 deenergized (through inverter 381 and $Q_{10}$-FIG. 4e).

In the normal mode, start switch 385 is pressed and released causing switch arm 385b to engage its stationary contact 385a thereby applying a low level to one input of NOR gate 373 shown in FIG. 4e. This will cause the output of NOR gate 375 to go high causing bistable flip-flop (RUN FF) comprised of NOR gates 375 and 376 to be set to its "run" state. STOP FF (FIG. 4e) is also simultaneously reset by operation of the start button 385. Start switch 385 also simultaneously releases the Jam Delay Circuit 320 through gate 318 (FIG. 4a), and inhibits the motor drive through gates 379, 381 and $Q_7$ (FIG. 4e). RUN FF, being set, energizes clutch 131 and deenergizes brake 137 via gate 380, inverter 382 and $Q_8$–$Q_9$ and $Q_{10}$–$Q_{11}$. After start switch 385 is released the second input of AND gate 397 goes high. In the "run" condition, the output of NOR gate 377 is high (see FIG. 4e) causing the three inputs of AND gate 379 to go high causing its output to go low. This causes NOR gate 381 to go high which initiates conduction of transistor $Q_7$. This energizes relay coil $K_1$ to couple the a.c. supply through switch 402 (which is now closed) to motor M to allow it to run. As each separated document passes through the acceleration wheels 62 (see FIG. 1) the light sensitive transistor 72 is energized to develop a count as was previously described. The count pulses appear at the output 319c of one-shot multivibrator 319 shown in FIG. 4a with the circuitry of FIGS. 3 and 4a described hereinabove performing the function of automatically adjusting the desired threshold level and preventing cuts, slits, punch holes or other perforations in a document from being erroneously detected as a "gap". When a document passes sensor 72 the light level is reduced resulting in a low level output from the detector (FIG. 3) whose output is applied to $C_2$ (FIG. 4a) which provides filtering against motor generated noise in the signal and then passes through gate 313 and inverter 314 to set the integrating single shot ISS Filter (FIG. 4a) which serves to prevent holes or mutilations in documents from falsely appearing as "gaps". The integrating single shot output is applied to one-shot multivibrator 319 whose output 319c is applied to $Q_3$–$Q_4$ which serve as a level translator and current amplifier for driving electromagnetic counter 426 (FIG. 4c).

Jam Delay Circuit 320 and Jam Prevention Delay Circuit 330 are prevented from being timed out so long as the time interval between the detection of "gaps" does not exceed the adjusted time outs for these circuits. In a case of time out of the Jam Delay Circuit 320 the output of inverter 321 goes low which condition is coupled to lead 430 to FIG. 4c. In the normal condition switch arm 364 is coupled to lower stationary contact 364a which couples this condition to lead 369 to input 376a of NOR gate 376 of FIG. 4e to set the bistable flip-flop comprised of NOR gates 375 and 376 to the off state causing the output of NOR gate 375 to go low which causes the output of AND gate 379 to go high. With the time out of Jam Delay Circuit 320 the output of AND gate 407 (see FIG. 4d) also goes high causing the output of NOR gate 381 to go low thereby rendering transistor $Q_7$ non-conductive to decouple power from the motor control device by opening contacts 402a and 402b. Also RUN FF (FIG. 4e) is reset, counting is inhibited by gate 313 (FIG. 4a) and JAM light 391 is lit.

Inverter 321 and gate 313 (FIG. 4a), together with gates 314, 317 and 318 form a "latch" which maintains the jam level as the documents are being removed and also prevent the document detector from producing spurious count pulses as it adjusts to the lower (shadowed) light level.

The counting process will continue as long as documents are supplied to the input hopper 14 (FIG. 1). The document-handling device may be stopped for any reason by depressing stop switch 387 which couples ground potential through movable contact 387b and stationary contact 387a to one input of NOR gate 378. This causes its output to go high setting the output of NOR gate 377 low which causes the output of NAND gate 379 to go high thereby setting the STOP-FF. This condition, together with a high condition at the output of AND gate 407 (see FIG. 4d) causes the output of NOR gate 381 to go low to decouple the a.c. supply from motor M. The output of NOR gate 377 is further coupled to NOR gate 380 causing its output to go high and thereby energizing the brake and deenergizing the clutch. This prevents documents being engaged by either the picker wheel, drive wheel or stripper wheel assemblies from any further movement into the document-handling device. The brake is simultaneously energized to abruptly halt the picker, drive and stripper wheels. Depressing either the CONTINUE key of the stop key will cause the STOP FF (FIG. 4e) to be reset.

The statistical sampling operation is performed in the following manner:

Switch arm 412b (FIG. 4c) is placed in the "discard" position, switch arm 362b is placed in the "stat" position and switch arm 352c is placed in the "batch/stat" position.

The thumbwheels are manipulated so that their number wheels show the size of the batch desired. As an example, FIG. 4c shows the setting where each batch is to contain 50 sheets.

The start button is depressed. The number in the thumbwheel switches is set into the electronic counter 340 as a result of the ground condition from the depression of start switch 385 being coupled through NOR gate 373 (whose output goes high) to develop a low level at the output of inverter 374 causing inputs 341c–343c of counter stages 341–343 respectively, to go low thereby causing the setting of the thumbwheel switches to be set into the electronic counter.

Release of the start button 385 causes NAND gate 379 to go low which causes the output of NOR gate 381 to go high thereby coupling power to motor M.

The setting of switches 364, 362, 383 and 352 result in high levels developed by gates 410 and 417 (FIG. 4f) and onto the inputs of gate 412 whose remaining input is quiescently in the high state (output 358A of gate 358-FIG. 4d). The output of gate 412 is low rendering $Q_{12}$ non-conductive, thereby deenergizing relay $K_2$. This permits gate relay 204 to move under the force of the biassing means toward the dotted line position 201' enabling documents to be discarded via conveyor belts 207–208 FIG. 1a).

When the tens and hundreds stages of the counter are in decimal "9" state and when the unit stage has reached the decimal "8" state, and when the state of the count pulse $I_{ss}$ indicates that the output of gate 355 in FIG. 4d goes low a document is not present in the region of GATE 204, causing the output of gate 358 (forming one-half of the flip-flop comprised of gates 357 and 358) to go low. This level is coupled to one input of NOR gate 412 whereby the output goes high to energize transistor $Q_{12}$ thereby coupling power to the gate relay 204 to set it to the solid line position 201 of FIG. 1b causing the sampled sheet to be stacked in stacker 80.

Just prior to the movement of the gate to the solid line position of FIG. 1b, the "sampled" sheet is slowed up by actuation of the clutch and braking mechanisms which occurs when the units stage of the electronic counter reaches a count of decimal "8". This condition is coupled through gate 354 (FIG. 4d), gates 324 and 325 (FIG. 4a) and gate 380 (FIG. 4e) to actuate the brake and clutch mechanisms 137 and 131, respectively, to slow down the "statistically sampled" sheet to provide the gate sufficient time to move.

This pulse is developed at the leading edge of the document preceding the statistical sample (i.e. the 49th document), and is active for the full duration of time that document is between the light source 65 and sensor 72.

After the passage of the trailing edge of the document preceding the statistical sample (i.e. the 49th document) the output of gate 354 goes high to actuate the clutch and brake mechanisms. Upon the occurrence of the gap between the trailing edge of the 49th document and the leading edge of the 50th document, the gate is set. As soon as this pulse is terminated and before the electronic counter is advanced by one count, gate 355 (FIG. 4d) sets the gate flip-flop (gates 357 and 358) to energize solenoid coil $K_2$ (see FIG. 4f) and set it to its solid state position shown in FIG. 1b. After counting the gap between the trailing edge of the statistically sampled document, the output of gate 356 goes low causing gate 393 to be enabled (see FIG. 4d) to develop a statistical sample reset pulse by multivibrator 397 which applies a low-going pulse on one input of gate 373 (FIG. 4e) resulting in a low-going pulse on the output of inverter 374 to be applied to inputs 341c, 342c, 343c, thereby re-initializing the respective counters in preparation for the following quantity of documents.

The documents following the "statistically sampled" document are again fed to the depository 215 shown in FIG. 1b until the next statistically sampled count is developed in the same way as was previously described.

In the batch operation, the switch 364b is connected to stationary contact 364c. Switch arm 352c is connected to stationary contact 352a and thumbwheel switches are set to provide the proper batch quantity.

Depressing the start button puts the contents on the count selected by thumbwheel switches 344–346 into the electronic counter through lead 359. The motor is prepped to start in the same manner as was previously described but does not start until the start button is released. This arrangement assures that the count of the count select switches 344–346 (FIG. 4c) is transferred into the electronic counter before the machine begins operation. When the START key is released, the load line 359 is no longer activated and the electronic counter 340 is free to count. As documents pass transistor 72, count pulses are applied to one-shot 319 (FIG. 4a) which causes counter 340 to increase its count.

The BATCH mode enables decoding gates 349, 355 and 356 to function. When a count of "999" is developed, Run FF (FIG. 4e) is reset to stop the further flow of documents and turn on the Batch Complete lamp 389 (FIG. 4c). Gate 381 (FIG. 4e) allows motor M to run as long as there is a document under detector 72 (FIG. 3) and so long as the Jam Detector circuit 320 has not been activated. This ensures run-out of the last document when batching or when depressing the stop key.

Documents are separated, counted and stacked in stacker 80 (see FIG. 1) until the 50th document is detected. This causes gate 356 (FIG. 4d) to be enabled which enables gate 366 to develop a high output which is inverted by inverter 367. The low output of inverter 367 is coupled through switch 364 to the input of gate 367 (FIG. 4c) which enables gates 370, 371 and transistor $Q_6$ (FIG. 4d) to couple power to the lamp 389 indicating that a batch has been completed. Simultaneously therewith the output of NOR gate 375 (FIG. 4e) goes low, causing gate 379 to go high and NOR gate 381 to go low, deenergizing transistor $Q_7$ and decoupling power from motor M.

Simultaneously therewith gate 356 when enabled couples a half condition through gate 366 and inverter 367 (FIG. 4d) and switch 364 to one input of NOR gate 376 to operate the clutch and braking mechanisms.

The completed batch may then be removed from the stacker 80 and the Start button is depressed to begin counting and stacking of the next batch.

The jam protection devices anticipate potential jam conditions so as to protect the equipment from being damaged before a jamming condition can reach serious proportions.

The jam delay circuit 320 of FIG. 4a will time out after a time interval which is less than the normal time duration between the sensing of two "gaps" causing gate 313 (FIG. 4a) to prevent further counts to be coupled into circuit 310. The output is also coupled to switch 364 at the operator's panel (FIG. 4c) to provide a halt signal which is coupled into NOR gate 376 (FIG. 4e and causes the bistable comprised of gates 375 and 376 to reverse state to energize the brake and clutch mechanisms through gates 380, 382 and transistors $Q_8$–$Q_9$ and $Q_{10}$–$Q_{11}$. Simultaneously therewith, the output of inverter 321 (FIG. 4a) is coupled through inverter 372 and transistor $Q_5$ (FIG. 4d) to lead 390 of FIG. 4c to illuminate the jam lamp 391. The resetting of the bistable comprised of gates 375 and 376 also causes gate 379 and one input of 381 (FIG. 4c) to go high. When the other input to 381 is high, which occurs when gate 407 (FIG. 4d) has its input level from inverter 321 low, the output of NOR gate 381 goes low to decouple power from motor M by opening switch arms 402a and 402b through the deenergization of relay solenoid $K_1$.

The jam prevention delay circuit 330 which has a slightly shorter time limit will time out causing transistor $Q_2$ to be rendered non-conductive. This high level is reversed through inverter 323 applying a low input to gate 324 causing its output to go high. This state is reversed by inverter 325 causing its output to go low. This condition is applied to one input of NOR gate 380 (FIG. 4a) to operate the clutch and brake mechanism in the same manner as was previously described and thereby preventing a jam before its possible occurrence. The jam prevention delay circuit 330 has a shorter time out period than jam delay circuit 320 so as to activate the clutch and brake mechanisms in anticipation of a jam. The jam delay circuit 320 goes one step further in that it deenergizes motor M which is caused to time out.

It can be seen from the foregoing description that the present invention provides novel control means for document handling devices and the like which are adapted for accepting sheets or other documents, preventing more than one document from passing through the drive and stripper means and for providing a gap between the separated document for counting purposes wherein the control means provides the functions of counting small or large numbers of documents, counting batches of documents of any predetermined batch size, counting documents and retaining statistical samples of the counted documents and further provides means for protecting the equipment against damage due to delays by anticipating any potential delay and immediately deenergizing the document handling equipment and providing an alarm indication in the form of a lamp (and/or audible alarm if desired) to alert the operator to a possible jam condition.

The electronics of the control system is further adapted to provide count pulses by sensing the separation between documents before they pass through the stacker to automatically adjust for changes in ambient conditions which may effect the sensitivity of the detector and to prevent perforations or mutilations within the documents themselves from being erroneously interpreted as a "gap" between separated documents. The circuit 310 of FIG. 4a is adapted so as to prevent such erroneous detections for mutilations or other perforations within the document passing between the lamp and light-sensitive transistor of openings as large as ¾ inch measured in the direction of feed of the documents.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A sensor for detecting the presence of gaps between documents fed in a first direction at spaced intervals with said gaps occurring between the trailing edge of a document and the leading edge of the next document, said sensor comprising:

a light source positioned to one side of the path of movement of the documents;

light sensitive means positioned to receive light of maximum intensity from said light source when the trailing edge of each document passes said light sensitive means to activate said light sensitive means and to receive light of a minimum intensity when a document is positioned between said light sensitive means and said source, said light sensitive means developing a signal at its output which varies with the intensity of light;

energy storage means;

first means coupled to said light sensitive means output for rapidly charging said energy storage means when said light sensitive means is activated by light of maximum intensity;

comparator means *normally maintained at a first output signal level and* having first and second inputs for generating [an] *a second* output signal *level different from said first output signal level* when the signal level at its first input exceeds the signal level at its second input;

said first input being coupled to the output of said light sensitive means;

second means coupled between said [first] *energy storage* means and said comparator means second input for coupling a portion of the signal level developed by said storage means to said second input;

said second means providing a discharge path for said energy storage means and being adapted to cause said energy storage means to discharge at a rate much slower than the charging rate to cause a substantial portion of the signal level developed by said storage means to be retained when said light sensitive means is deactivated due to the movement of the document past said light source;

*storage means coupled to said comparator means and being charged to a first level when said comparator means develops said first output signal level and being discharged towards a second lower level when said comparator means develops an output which is at said second output signal level;*

*logical gating means responsive only to the simultaneous presence of said comparator means second output signal level and the discharge of said storage means to said second lower level to generate a count pulse representative of the passage of a document.*

2. The sensor of claim 1 wherein said second means is a voltage divider comprised of resistance elements and said storage means is a capacitor coupled in parallel across said voltage divider;

said voltage divider forming a discharge path for said capacitor.

3. [The sensor of claim 1 further comprising] *A sensor for detecting the presence of gaps between documents fed in a first direction at spaced intervals with said gaps occurring between the trailing edge of a document and the leading edge of the next document, said sensor comprising:*

*a light source positioned to one side of the path of movement of the documents;*

*light sensitive means positioned to receive light of maximum intensity from said light source when the trailing edge of each document passes said light sensitive means to activate said light sensitive means and to receive light of a minimum intensity when a document is positioned between said light sensitive means and said source, said light sensitive means developing a signal at its output which varies with the intensity of light;*

*first energy storage means;* first means coupled to said light sensitive means output for rapidly charging said first energy storage means when said light sensitive means is activated by light of maximum intensity;

*comparator means having first and second inputs for generating an output signal when the signal level at its first input exceeds the signal level at its second input;*

*said first input being coupled to the output of said light sensitive means;*

*second means coupled between said first energy storage means and said comparator means second input for coupling a portion of the signal level developed by said first energy storage means to said second input;*

*said second means providing a discharge path for said first energy storage means and being adapted to cause said first energy storage means to discharge at a rate much slower than the charging rate to cause a substantial portion of the signal level developed by said first energy storage means to be retained when said light sensitive means is deactivated due to the movement of the document past said light source;* a bistable circuit having first and second inputs and a first output;

said *bistable circuit* first input being coupled to the output of said comparator means *for setting said bistable circuit;* gate means having first and second inputs coupled respectively to said comparator means and [said second output] *the first output of said bistable circuit,* and having an output coupled to said *bistable circuit* second input;

*second* energy storage means coupled to the [output] *second input* of said *bistable circuit for resetting the bistable circuit and including means coupled to said* gate means [and being adapted] *enabling the second energy storage means* to charge rapidly and discharge slowly *under control of the gate means;* said bistable circuit being reset when said comparator detects a gap to discharge said *second* energy storage means;

said *second* energy storage means being adapted to prevent resetting of said bistable circuit until it has discharged *to a suitable level* within a predetermined time interval thereby preventing said bistable circuit from being reset during a time interval less than the *predetermined time interval which represents the* time of passage of a gap *of at least a predetermined length* to prevent spurious pulses, developed as a document is passing said light sensitive means, from setting said bistable circuit[;], until it has been reset whereby apertures in said documents *shorter than said predetermined length* passing said detecting means are prevented from being detected as a gap.

4. Sensing means for counting documents fed in a predetermined direction at spaced intervals with a gap between the trailing edge of each document and the leading edge of the next following document comprising:

detecting means for detecting said gaps to generate a first output level during the occurrence of each gap as the trailing edge of each document passes said detecting means and a second output level as the leading edges of each succeeding document passes said detecting means;

bistable means having first and second inputs and [and] *an* output, said first input coupled to said detecting means for generating a first output level at the output of said bistable circuit when each leading edge passes said detecting means;

gate means having inputs coupled to said detector means and the output of bistable circuit for coupling a setting signal at its output to said bistable circuit second input to permit said bistable circuit to be set when the leading edge of a document is sensed by said detecting means;

energy storage means charged by the output of said gate means, means coupled to said energy storage means to prevent said second input from being reset for a predetermined time interval after the psssage of each trailing edge during which time interval said energy storage means is prevented from discharging below a predetermined level to prevent setting of bistable means due to the detection of apertures in said documents by said detection means.

5. The sensing means of claim 4 wherein the energy storage means is a capacitor adapted to charge rapidly during setting of said bistable circuit and to discharge slowly when said first level generated by said detecting means is to prevent reset of said bistable circuit.

6. The sensing means of claim 5 wherein the capacitance of said capacitor is selected to prevent resetting of said bistable circuit when said first level persists for a time less than the interval of a gap between documents.

7. Control means for operating apparatus for counting and stacking documents comprising:

first means for receiving a stack of documents;

stacking means;

second means for separating said stack of documents and advancing said separated documents, one at a time to said stacking means whereby a gap is provided between the trailing edge of each document and the leading edge of the next document;

sensing means arranged at a predetermined location for detecting the presence of each gap to generate counting pulses;

means coupled to said sensing means for counting said documents;

jam detector means for generating a first output level when the time interval between succeeding count pulses is greater than the time required for one document to pass said sensing means, said jam detector being reset by said sensing means each time a count pulse is generated by said sensing means to normally prevent generation of said first output level;

gate means coupled to said jam detector means for preventing said sensing means for transferring count pulses to said counting means when said jam detection means generates said first output level.

8. The control means of claim 7 further comprising second gate means coupled to said jam detection means for halting said second means upon the occurrence of said first output level.

9. Control means for operating apparatus for counting and stacking documents comprising:

first means for receiving a stack of documents;

second means for separating said stack of documents and advancing said separated documents one at a time in a feed direction;

stacking means;

third means for accelerating documents advanced by second means toward said stacking means to create gaps between adjacent documents;

motor means;

clutch means for selectively coupling said second means to said motor means;

braking means for selectively halting said second means;

means coupled between said motor means and said third means for operating said third means so long as said motor means is energized;

sensing means for detecting the presence of each gap to [geneate] *generate* counting pulses;

means coupled to said sensing means for counting said documents;

settable means for setting said counter means to any predetermined count N, said settable means including first gate means responsive to said counting means for generating an output when said counting means reaches a count of N-1;

diverter gate means for normally extending into the path of movement of said documents diverting documents accelerated by said third means away from stacking means;

second gating means coupled between said gate means and diverter means for moving said diverter means out of the path movement of said documents when said first gate means detects a count of N-1;

said second gating means including means for operating said braking means and said clutch means to decouple said second means from said motor means to to abruptly halt said second means to provide sufficient time for said diverter means to move out of the path of movement of said documents;

means coupled between said sensing means and said second gating means for causing said second gating means output to terminate after a predetermined time interval to cause said braking means to be released and said clutch means to couple said motor means to said second means;

third gating means coupled to said counting means for generating an output when said counting means reaches a count of N;

means coupled between said third gating means and said diverter means for moving said diverter means into the path of movement of the documents;

said third gating means including first bistable means coupled to said brake and clutch means for decoupling said second means from said motor means and abruptly halting said second means when a count of N is achieved;

delay means coupled to said third gating means for resetting said bistable means after a predetermined interval to release said brake means and cause said clutch means to couple said motor means to said second means after said diverter means is moved into the path of movement of said documents.

10. Sensing means for counting documents fed in a predetermined direction at spaced intervals with a gap between the trailing edge of each document and the leading edge of the next succeeding document and for preventing the generation of spurious counts due to apertures, slits or other openings in said documents comprising:

means for detecting said documents to generate a first level as the trailing edge of a document passes said detection means and to generate a second level signal as the leading edge of the next succeeding document passes said detection means;

charge storing means coupled to said detection means for storing electrical energy developed by said detection means during the time that each leading and trailing edge passes said detection means and for discharging electrical energy that the gaps between documents pass said detection means;

bistable means having inputs coupled to said storing means and to said detection means for being set when the output of said detection means is at said second level and reset when said energy storing means discharges to a predetermined threshold level and the output of said detection means is at said first level;

second means coupled between said energy storage means and said detection means for enabling said energy storage means to charge rapidly after said detection means reaches said second level and for causing said energy storage means to discharge at a slow rate after said detection means reaches said first level;

said second means being adapted to permit said energy storage means to discharge to a level below said threshold level before the leading edge of the next document is detected by said detection means to permit resetting of said bistable means and being further adapted to prevent said energy storage means from discharging below said threshold level when said detection means detects openings, slits or other mutilations in said documents which cause said detection means to generate said first level output for a time duration shorter in length than the time interval for a gap to pass said detection means whereby the detection of openings, slits or other mutilations in said documents are prevented from being interpreted as the gap between documents;

means coupled to said bistable means for generating a count pulse when said bistable circuit is set.

11. The sensing means of claim 10 further comprising means coupled to said pulse generating means for accumulating a count of said pulses.

12. The sensing means of claim 10 wherein the gap distance between documents in a minimum of 0.6 inches and wherein said second means enables said energy storage means discharge below said threshold in slightly less time than the time interval during which a gap passes said detection means to prevent openings in said documents less than 0.4 inches long (measured in the direction of travel) are thereby prevented from being interpreted as a gap between documents.

13. The sensing means of claim 10 further comprising timing means coupled between said detection means and said bistable means for preventing setting of said bistable means when said bistable means has not been reset within a predetermined time interval which is greater in duration than the time required for a document to pass said detection means.

14. The sensing means of claim 13 further comprising second timing means coupled to said bistable means for generating a signal a second predetermined time after said bistable means is reset to generate a jam signal, said second predetermined time being greater in duration than the time required for the leading edges of two successive documents to pass said sensing means;

means coupled to said second timing means for halting the feeding of said documents.

15. Apparatus for detecting documents moving along a path at spaced intervals comprising:

a light source positioned on one side of said path;

a light detector positioned on the remaining side of said path and adapted to generate a signal at its output whose signal amplitude is at a first level when a document is passing between the source and the detector and is at a second level when no document is between the source and the detector;

a comparator having first and second inputs, said first input being coupled to the output of said detector;

a capacitor;

means coupled to said detector output for developing a charging current to instantaneously charge said capacitor upon the occurrence of one of said signal levels and for terminating said charging current upon the occurrence of the remaining one of said signal levels;

a discharge circuit coupled to said capacitor for discharging said capacitor at a slower rate than the charging rate of said capacitor;

said discharge circuit comprising a voltage divider circuit for applying a portion of the voltage across said capacitor to the second input of said comparator;

said comparator being adapted to generate an output *of a predetermine level* only when the signal level at its first input is greater than the signal level at its second input;

*storage means coupled to said comparator means and being charged to a first level when said comparator means output is not at said predetermined level and being discharged to a second lower level when said comparator means ouput is at said predetermined level;*

*logical gating means responsive only to the simultaneous presence of said predetermined level at the output of said comparator and the discharge of said storage means to said second level to generate a count pulse representative of the passage of a document.*

*16. The apparatus of claim 1 further comprising diode means coupling said storage means to said comparator means to permit rapid charging of said storage means and resistance means coupling said storage means to said comparator means for causing the discharge of said storage means to occur at a reduced rate.*

*17. Apparatus for detecting documents moving along a path at spaced intervals comprising:*

*a light source positioned on one side of said path;*

*light detector means positioned on the remaining side of said path and adapted to generate a signal at its output whose signal amplitude is determined by the magnitude of the light impinging upon said detector means;*

*means for establishing a threshold level;* comparator means coupled to the threshold means and the output of said light detector means for generating a first output level when the amplitude of said detector means output is above said threshold level and for generating a second output level when the amplitude of said detector means output is below said threshold level;

*means responsive to said detector means output for adjusting the threshold level to thereby automatically compensate for deviations in the detector means due to ambient conditions, components aging, and the like;*

*storage means coupled to said comparator means and being charged to a first level when said comparator means output is at one of its first and second levels and being discharged to a second lower level when said comparator means output is at the remaining one of said first and second levels;*

*logical gating means responsive only to the simultaneous presence of said one of said first and second levels at the output of said comparator means and the discharge of said storage means to said second level to generate a count pulse representative of the passage of a document.*

* * * * *